(12) United States Patent
Rege et al.

(10) Patent No.: US 12,520,181 B2
(45) Date of Patent: Jan. 6, 2026

(54) MEASUREMENT REPORTING TECHNIQUES FOR BEAMFORMED COMMUNICATIONS

(71) Applicant: QUALCOMM Incorporated, San Diego, CA (US)

(72) Inventors: Vishwesh Pratap Rege, Bellevue, WA (US); Raj Kumar Nattha, San Diego, CA (US); Jyothi Kiran Vattikonda, San Diego, CA (US); Yongle Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 17/702,508

(22) Filed: Mar. 23, 2022

(65) Prior Publication Data

US 2022/0312249 A1 Sep. 29, 2022

Related U.S. Application Data

(60) Provisional application No. 63/166,107, filed on Mar. 25, 2021.

(51) Int. Cl.
*H04W 24/10* (2009.01)
*H04B 7/06* (2006.01)

(52) U.S. Cl.
CPC .......... *H04W 24/10* (2013.01); *H04B 7/0626* (2013.01); *H04B 7/0632* (2013.01)

(58) Field of Classification Search
CPC .. H04B 7/0626; H04B 7/0632; H04B 7/0695; H04W 24/10; H04W 36/0058; H04W 36/0094
See application file for complete search history.

(56) References Cited

U.S. PATENT DOCUMENTS

2020/0003743 A1 1/2020 Van Schriek et al.
2020/0403743 A1* 12/2020 Bergqvist ............ H04W 56/001
2021/0083730 A1* 3/2021 Hwang ................. H04L 5/0092
(Continued)

FOREIGN PATENT DOCUMENTS

WO WO-2019098920 A1 * 5/2019
WO WO-2020231853 A1 11/2020

OTHER PUBLICATIONS

International Search Report and Written Opinion—PCT/US2022/071309—ISA/EPO—Jul. 7, 2022.

*Primary Examiner* — Awet Haile
(74) *Attorney, Agent, or Firm* — Holland & Hart LLP/Qualcomm

(57) ABSTRACT

Methods, systems, and devices for wireless communication are described for measurement reporting in beamformed communications. A user equipment (UE) may establish a connection with a serving cell using one or more refined beams, and may measure one or more quality metrics of the serving cell using a wider beam than the refined beam, which may provide a uniform comparison with measured quality metrics of other cells using wider beams. Further, the UE may apply a time threshold to one or more quality metric measurements to exclude older measurements from a measurement report. A base station or serving cell may configure the UE to perform quality metric measurements and apply time thresholds for reporting measurements, which may be enabled or disabled based on one or more parameters.

24 Claims, 18 Drawing Sheets

(56) References Cited

U.S. PATENT DOCUMENTS

| | | | |
|---|---|---|---|
| 2022/0173864 A1* | 6/2022 | Yu | H04B 7/0695 |
| 2022/0190883 A1* | 6/2022 | Kaya | H04W 36/085 |
| 2022/0321240 A1* | 10/2022 | Zhang | H04W 72/20 |
| 2023/0262570 A1* | 8/2023 | Nader | H04W 36/085 |
| | | | 370/331 |
| 2023/0370228 A1* | 11/2023 | Kim | H04L 5/0023 |
| 2024/0049154 A1* | 2/2024 | Svendsen | H04L 5/0048 |
| 2024/0073944 A1* | 2/2024 | Wang | H04B 7/0408 |

* cited by examiner

| | | | | | | Meas. Report Time |
|---|---|---|---|---|---|---|
| UE Beam ID | 0 | 1 | 2 | 3 | 4 | 5 |
| Time (ms) | -500 | -400 | -300 | -200 | -100 | 0 |
| RSRP Cell A | -80 | -80 | -80 | -80 | -80 | -80 |
| RSRP Cell B | -60 | -70 | -90 | -90 | -80 | -90 |
| RSRP Serving Cell | -90 | -90 | -100 | -100 | -100 | -100 |

Cell B Indicated As Best Cell Without Measurement Time Threshold — 335

Cell A Indicated As Best Cell With 300 ms Time Threshold — 340

FIG. 3

MEASUREMENT REPORTING TECHNIQUES FOR BEAMFORMED COMMUNICATIONS

CROSS REFERENCE

The present Application for Patent claims the benefit of U.S. Provisional Patent Application No. 63/166,107 by REGE et al., entitled "MEASUREMENT REPORTING TECHNIQUES FOR BEAMFORMED COMMUNICATIONS," filed Mar. 25, 2021, assigned to the assignee hereof, and expressly incorporated by reference herein.

FIELD OF TECHNOLOGY

The following relates to wireless communication, including measurement reporting techniques for beamformed communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may support communications using multiple beams using beamforming techniques (e.g. for millimeter wave (mmW) communications). In such systems, beam selection techniques may include transmission of multiple synchronization signal blocks (SSBs) by the base station that may be measured by the UE for selection of one or more beams that provide suitable channel quality for communications. For a selected beam based on SSB measurement, the UE and base station may perform further beam refinement as part of a beam training procedure. After a connection is established, the UE may continue to monitor beams and a handover between base stations or cells, or a beam switch, may be performed based on such ongoing measurements. Techniques for enhancing the monitoring and measurement of beams may be desirable for improving overall system efficiency and reliability.

SUMMARY

The described techniques relate to improved methods, systems, devices, and apparatuses that support measurement reporting techniques for beamformed communications. In various aspects described herein, techniques for beam monitoring of user equipment (UE) beams provide for enhanced reliability and accuracy in reported quality metrics that may be provided to a base station. In some cases, a UE may establish a connection with a serving cell using one or more refined beams that have a narrower beam width (e.g., with higher gain) than a wider beam (e.g., with lower gain) that is used to monitor for SSBs of one or more cells. After establishing the connection using the refined beam, in some aspects of the disclosure, the UE may measure one or more quality metrics of the serving cell using the wider beam rather than the refined beam, which may provide a uniform comparison with measurements of other cells that use wider beams. In some cases, the UE may use measurements using the wider beams of the serving cell and neighbor cells to trigger a measurement report, and thereby prevent the UE from remaining on a suboptimal cell when other cells may have better channel quality.

Additionally, or alternatively, a UE may apply a time threshold to one or more quality metric measurements. In such cases, quality metrics that were measured prior to the time threshold may be excluded from a measurement report, which may reduce a number of stale measurements and provide a more accurate representation of current channel conditions observed at the UE. In some cases, an access network entity or serving cell may configure the UE to perform quality metric measurements and apply time thresholds for reporting measurements. In some cases, techniques as discussed herein may be enabled or disabled based on channel conditions, UE mobility, number of UE beams, SSB periodicity, or combinations thereof. In some cases, the UE may enable or disable such reporting techniques based on conditions observed at the UE.

A method for wireless communication at a user equipment (UE) is described. The method may include communicating with a first cell using at least a first UE beam, where the first UE beam is a narrower beam than a second UE beam used for a first synchronization signal block that is transmitted by the first cell, measuring a quality metric of the second UE beam for the first cell, and one or more other quality metrics of one or more other UE beams for other synchronization signal blocks of one or more cells including the first cell, one or more neighbor cells, or any combinations thereof, and transmitting a measurement report to the first cell based on the quality metric measurements.

An apparatus for wireless communication at a UE is described. The apparatus may include a processor, memory coupled with the processor, and instructions stored in the memory. The instructions may be executable by the processor to cause the apparatus to communicate with a first cell using at least a first UE beam, where the first UE beam is a narrower beam than a second UE beam used for a first synchronization signal block that is transmitted by the first cell, measure a quality metric of the second UE beam for the first cell, and one or more other quality metrics of one or more other UE beams for other synchronization signal blocks of one or more cells including the first cell, one or more neighbor cells, or any combinations thereof, and transmit a measurement report to the first cell based on the quality metric measurements.

Another apparatus for wireless communication at a UE is described. The apparatus may include means for communicating with a first cell using at least a first UE beam, where the first UE beam is a narrower beam than a second UE beam used for a first synchronization signal block that is transmitted by the first cell, means for measuring a quality metric of the second UE beam for the first cell, and one or more other quality metrics of one or more other UE beams for other synchronization signal blocks of one or more cells including the first cell, one or more neighbor cells, or any combinations thereof, and means for transmitting a measurement report to the first cell based on the quality metric measurements.

A non-transitory computer-readable medium storing code for wireless communication at a UE is described. The code may include instructions executable by a processor to communicate with a first cell using at least a first UE beam, where the first UE beam is a narrower beam than a second UE beam used for a first synchronization signal block that is transmitted by the first cell, measure a quality metric of the second UE beam for the first cell, and one or more other quality metrics of one or more other UE beams for other synchronization signal blocks of one or more cells including the first cell, one or more neighbor cells, or any combinations thereof, and transmit a measurement report to the first cell based on the quality metric measurements.

In some examples of the method, apparatuses, and non-transitory computer-readable medium described herein, the transmitting the measurement report may include operations, features, means, or instructions for generating a measurement report message that includes quality metric measurements that are measured within a predetermined time period prior to generating the measurement report message. In some examples of the method, apparatuses, and non-transitory computer-readable medium described herein, the quality metric measurements include a timed cell quality metric that indicates a highest quality synchronization signal block measurement within the predetermined time period for each reported synchronization signal block of the first cell and one or more neighbor cells. In some examples of the method, apparatuses, and non-transitory computer-readable medium described herein, the quality metric measurements include a timed synchronization signal block quality metric that indicates a highest quality measurement on channel state information (CSI) reference signal resources or synchronization signal block resources of the first cell and one or more neighbor cells.

In some examples of the method, apparatuses, and non-transitory computer-readable medium described herein, the transmitting the measurement report may include operations, features, means, or instructions for determining that one or more measurements within the predetermined time period cross a threshold value for triggering the measurement report. In some examples of the method, apparatuses, and non-transitory computer-readable medium described herein, one or more quality metric measurements obtained prior to the predetermined time period are excluded from the measurement report message. In some examples of the method, apparatuses, and non-transitory computer-readable medium described herein, the transmitting the measurement report, based on the second beam of the first cell, prompts an earlier transmission of the measurement report relative to a measurement report that is based on a quality metric measurement of the first beam.

Some examples of the method, apparatuses, and non-transitory computer-readable medium described herein may further include operations, features, means, or instructions for receiving, from the first cell, configuration information that enables usage of the quality metric of the second beam for triggering the transmission of the measurement report. In some examples of the method, apparatuses, and non-transitory computer-readable medium described herein, the configuration information includes time threshold information for including quality metric measurements in the measurement report. Some examples of the method, apparatuses, and non-transitory computer-readable medium described herein may further include operations, features, means, or instructions for determining, based on one or more parameters provided in the configuration information, a time threshold for including quality metric measurements in the measurement report. In some examples of the method, apparatuses, and non-transitory computer-readable medium described herein, the one or more parameters include one or more of a measured mobility of the UE, a number of active UE beams, a periodicity of synchronization signal block transmissions, or any combinations thereof. In some examples of the method, apparatuses, and non-transitory computer-readable medium described herein, the measurement report includes the quality metric of the first synchronization signal block and one or more quality metrics associated with the first UE beam.

A method for wireless communication at an access network entity is described. The method may include communicating with a UE via a first cell using at least a first UE beam, where the first UE beam is a narrower beam than a second UE beam used for a first synchronization signal block that is transmitted by the first cell, configuring the UE to transmit a measurement report based on a quality metric of the second UE beam of the first cell and one or more other quality metrics of one or more other UE beams for synchronization signal blocks of one or more cells including the first cell, one or more neighbor cells, or any combinations thereof, and receiving the measurement report from the UE.

An apparatus for wireless communication at an access network entity is described. The apparatus may include a processor, memory coupled with the processor, and instructions stored in the memory. The instructions may be executable by the processor to cause the apparatus to communicate with a UE via a first cell using at least a first UE beam, where the first UE beam is a narrower beam than a second UE beam used for a first synchronization signal block that is transmitted by the first cell, configure the UE to transmit a measurement report based on a quality metric of the second UE beam of the first cell and one or more other quality metrics of one or more other UE beams for synchronization signal blocks of one or more cells including the first cell, one or more neighbor cells, or any combinations thereof, and receive the measurement report from the UE.

Another apparatus for wireless communication at an access network entity is described. The apparatus may include means for communicating with a UE via a first cell using at least a first UE beam, where the first UE beam is a narrower beam than a second UE beam used for a first synchronization signal block that is transmitted by the first cell, means for configuring the UE to transmit a measurement report based on a quality metric of the second UE beam of the first cell and one or more other quality metrics of one or more other UE beams for synchronization signal blocks of one or more cells including the first cell, one or more neighbor cells, or any combinations thereof, and means for receiving the measurement report from the UE.

A non-transitory computer-readable medium storing code for wireless communication at an access network entity is described. The code may include instructions executable by a processor to communicate with a UE via a first cell using at least a first UE beam, where the first UE beam is a narrower beam than a second UE beam used for a first synchronization signal block that is transmitted by the first cell, configure the UE to transmit a measurement report based on a quality metric of the second UE beam of the first cell and one or more other quality metrics of one or more other UE beams for synchronization signal blocks of one or more cells including the first cell, one or more neighbor cells, or any combinations thereof, and receive the measurement report from the UE.

In some examples of the method, apparatuses, and non-transitory computer-readable medium described herein, the measurement report includes quality metric measurements that are measured within a predetermined time period prior to generating the measurement report. In some examples of the method, apparatuses, and non-transitory computer-readable medium described herein, the quality metric measurements include a timed cell quality metric that indicates a highest quality synchronization signal block measurement within the predetermined time period for each reported synchronization signal block of the first cell and one or more neighbor cells. In some examples of the method, apparatuses, and non-transitory computer-readable medium described herein, the quality metric measurements include a timed synchronization signal block quality metric that indicates a highest quality measurement on CSI reference signal resources or synchronization signal block resources of the first cell and one or more neighbor cells.

In some examples of the method, apparatuses, and non-transitory computer-readable medium described herein, the configuring the UE may include operations, features, means, or instructions for transmitting configuration information to the UE that indicates the UE is to exclude one or more quality metric measurements obtained prior to the predetermined time period from the measurement report. In some examples of the method, apparatuses, and non-transitory computer-readable medium described herein, the configuration information includes time threshold information for including quality metric measurements in the measurement report.

In some examples of the method, apparatuses, and non-transitory computer-readable medium described herein, the configuration information includes one or more parameters for determining a time threshold for including quality metric measurements in the measurement report. In some examples of the method, apparatuses, and non-transitory computer-readable medium described herein, the one or more parameters include one or more of a measured mobility of the UE, a number of active UE beams, a periodicity of synchronization signal block transmissions, or any combinations thereof. In some examples of the method, apparatuses, and non-transitory computer-readable medium described herein, the measurement report includes the quality metric of the first synchronization signal block and one or more quality metrics associated with the first UE beam.

BRIEF DESCRIPTION OF THE DRAWINGS

FIGS. 3 and 4 illustrate examples of measured quality metrics in accordance with aspects of the present disclosure.

DETAILED DESCRIPTION

Figure 1:
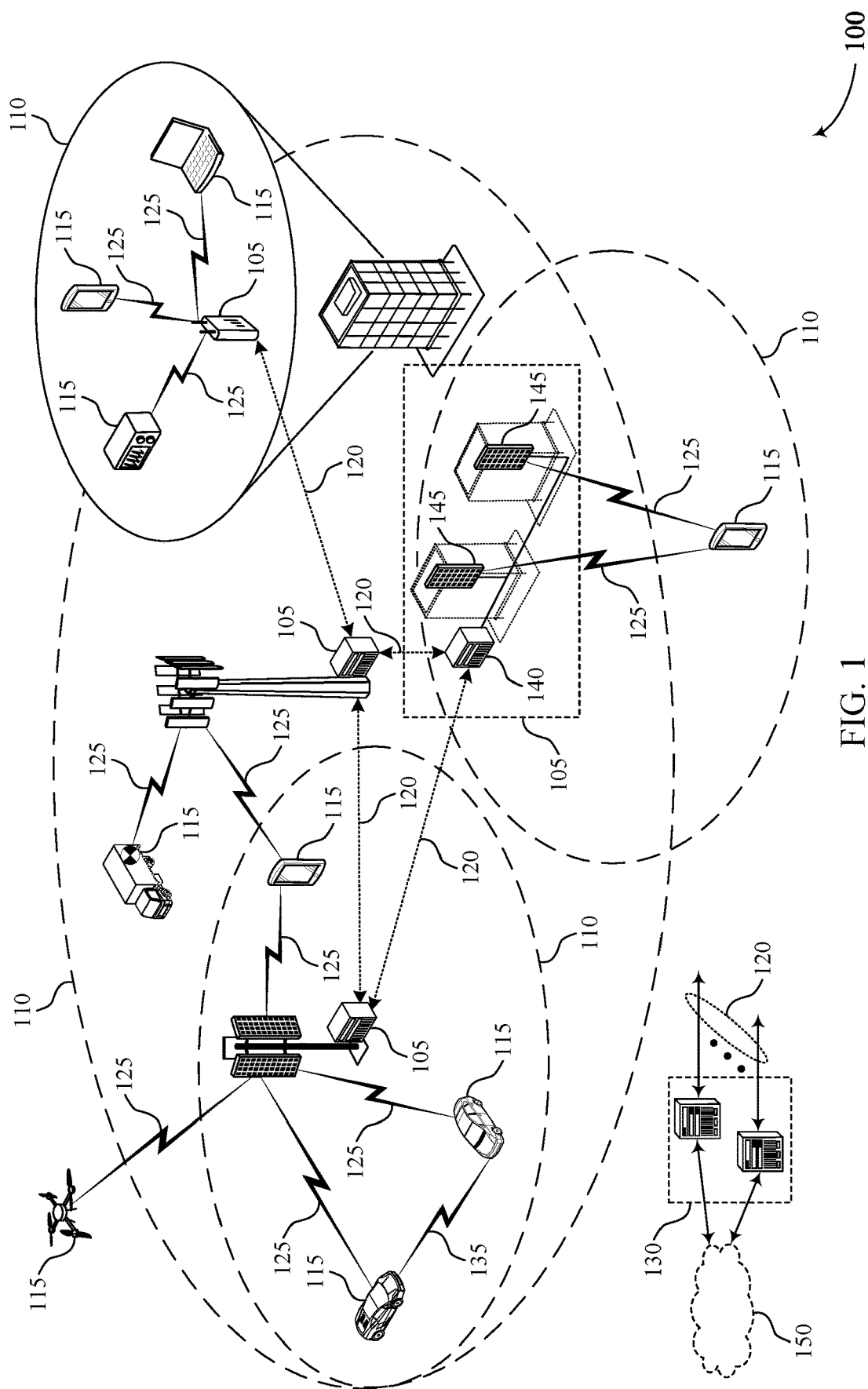
FIG. 1 illustrates an example of a wireless communications system that supports measurement reporting techniques for beamformed communications in accordance with aspects of the present disclosure.

In some wireless communications systems, a user equipment (UE) and a base station or serving cell may support beamformed communications using one or multiple beams. In such systems, beam selection may be based on measurements of multiple synchronization signal blocks (SSBs) that are transmitted by the base station and measured by the UE. In some cases, UE beams used for measurement (e.g., based on UE receiver circuitry being tuned in different directions) may have a relatively wide width for monitoring of SSBs. In some cases, UE beams used for measurement of SSBs from one or multiple serving cells may be referred to as P0 beams. Further, UE beams for different SSBs of different serving cells may be measured in a round robin fashion, and some measurements may be relatively old due to the amount of time it takes the UE to cycle through all of the UE beams for different SSBs, which in some cases may result in stale measurements for one or more cells that are no longer representative of current channel conditions between the UE and the cell.

In some cases, existing techniques may provide that the UE will not trigger a measurement report (e.g., an A1-A6 event based on serving cell and/or neighboring cell quality metrics) until all UE beams see channel quality metrics (e.g., one or more of reference signal received power (RSRP), reference signal received quality (RSRQ), received signal strength indicator (RSSI), etc.) that satisfy a threshold criteria. Existing techniques provide that in the event that a handover is to be triggered, the UE may send a measurement report considering the best of all measured UE beams irrespective of the staleness of the measurements. However, in some cases such as discussed above, waiting for all measurements may result in a measurement report being transmitted relatively late as the measurement report (e.g., a channel state information (CSI) report) is not triggered until all UE beams are updated with new measurements. Further, in some cases, relatively old quality metric measurements for one or more UE beams may result in a handover or beam switch to a less ideal cell or SSB, as the best cell or SSB included in the measurement report may be based on stale values, and result in less reliable decision making by the network (e.g. base station) for handover determinations.

Additionally, existing techniques provide that for an established serving cell, measurements are provided based on the beam used for communications with the serving cell. However, such a beam may be a refined beam that may have a higher channel gain than wider beams that may be used for measurement of other SSBs and/or other cells. Thus, in some cases the serving cell quality metrics based on the refined beam may indicate better channel quality than would be measured with a wider beam, and thus quality metrics of the serving cell may be artificially higher than the reported quality metrics of other cells due to the difference in beam width.

In various aspects described herein, techniques for beam monitoring of UE beams provide for enhanced reliability and accuracy in reported quality metrics that may be provided to a base station. In some cases, the UE may measure one or more quality metrics of the serving cell using the wider beam rather than the refined beam, which may provide a uniform comparison with measurements of other cells that use wider beams. Thus, the UE may use measurements using the wider beams of the serving cell and neighbor cells to trigger a measurement report, and thereby prevent the UE from remaining on a suboptimal cell when other cells may have better channel quality.

Additionally, or alternatively, a UE may apply a time threshold to one or more quality metric measurements. In such cases, quality metrics that were measured prior to the time threshold may be excluded from a measurement report, which may reduce a number of stale measurements and provide a more accurate representation of current channel conditions observed at the UE. In some cases, a base station or serving cell may configure the UE to perform quality metric measurements and apply time thresholds for reporting measurements. In some cases, techniques as discussed herein may be enabled or disabled based on channel conditions, UE mobility, number of UE beams, SSB periodicity, or combinations thereof. In some cases, the UE may enable or disable such reporting techniques based on conditions observed at the UE.

Such techniques may provide efficient mechanisms for a UE to provide accurate and timely measurement reports that may be used for handover determination to allow the UE to be switched between serving cells that have suitable channel quality for reliable communications. Further, such techniques may enhance communications by providing higher reliability communications that may use reduced power. Thus, latency, bandwidth, and network efficiency may be enhanced, providing reduced power consumption (e.g., through fewer retransmissions, higher coding rates, etc.) and improved user experience.

Aspects of the disclosure are initially described in the context of wireless communications systems. Examples of quality metric measurements and a process flow are then described that illustrate various techniques provided herein. Aspects of the disclosure are further illustrated by and described with reference to apparatus diagrams, system diagrams, and flowcharts that relate to measurement reporting techniques for beamformed communications.

FIG. 1 illustrates an example of a wireless communications system 100 that supports measurement reporting techniques for beamformed communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a UE 115 may establish a connection with a serving cell of a base station 105 using one or more refined beams that have a narrower beam width (e.g., with higher gain) than a wider beam (e.g., with lower gain) that is used to monitor for SSBs of one or more cells. After establishing the connection using the refined beam, the UE 115 may measure one or more quality metrics of the serving cell using the wider beam rather than the refined beam, which may provide a uniform comparison with measurements of other cells that use wider beams. In some cases, the UE 115 may use measurements using the wider beams of the serving cell and neighbor cells to trigger a measurement report, and thereby prevent the UE 115 from remaining on a suboptimal cell when other cells may have better channel quality. Additionally or alternatively, the UE 115 may apply a time threshold to one or more quality metric measurements to exclude older measurements (e.g., that may be stale) from a measurement report. In some cases, a base station 105 or serving cell may configure the UE 115 to perform quality metric measurements and apply time thresholds for reporting measurements. In some cases, techniques as discussed herein may be enabled or disabled based on channel conditions, UE mobility, number of UE beams, SSB periodicity, or combinations thereof. In some cases, the UE 115 may enable or disable such reporting techniques based on observed conditions.

Figure 2:
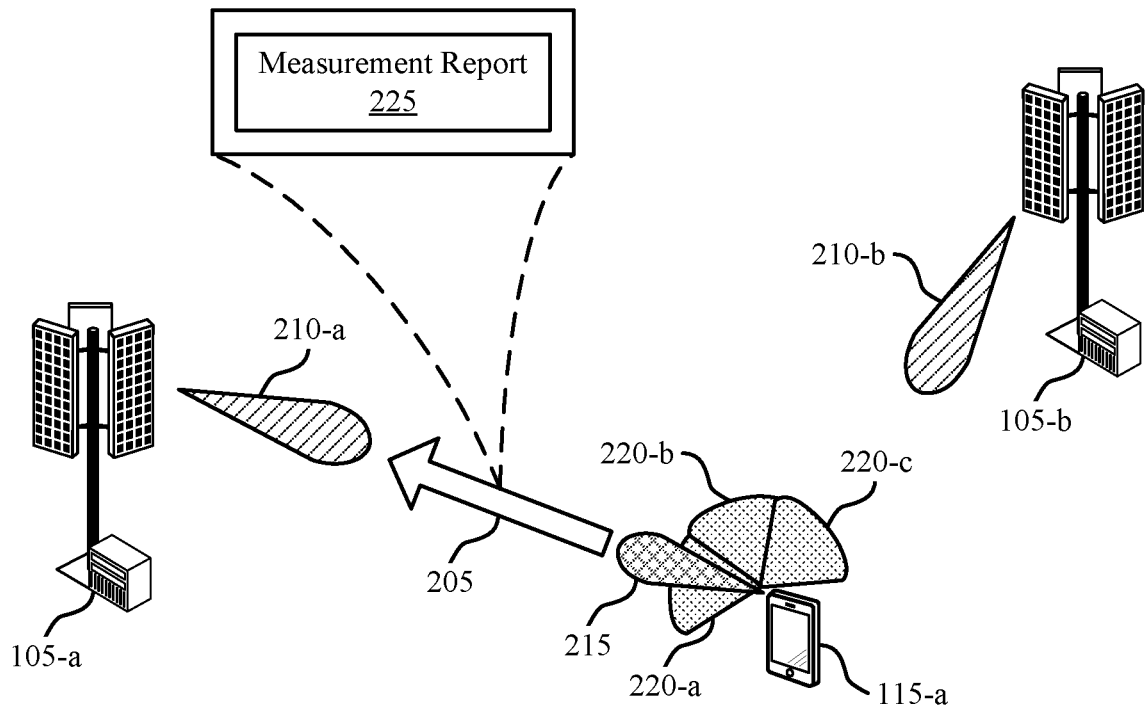
FIG. 2 illustrates an example of a portion of a wireless communications system that supports measurement reporting techniques for beamformed communications in accordance with aspects of the present disclosure.

FIG. 2 illustrates an example of a wireless communications system 200 that supports measurement reporting techniques for beamformed communications in accordance with aspects of the present disclosure. In some examples, wireless communications system 200 may implement aspects of wireless communication system 100 and may include UE 115-a, a first base station 105-a that may be or include a serving cell, and a second base station 105-b that may provide one or more neighboring cells. Base stations 105 and UE 115-a may be examples of UEs 115 and base stations 105 as described with reference to FIG. 1.

In some examples, the first base station 105-a may provide a serving cell and establish communications with the UE 115-a using a beam pair link that includes a base station beam 210-a and a UE beam 215. The UE beam 215 may be a refined beam (which may be an example of a first UE beam) that has a narrower beam width than UE wide beams 220 (which may be examples of a second UE beam) that may be used for SSB measurements by the UE 115-*a*. In this example, the second base station 105-*b* may include one or more neighboring cells, and may transmit a base station beam 210-*b* that may be used to transmit SSBs of the neighboring cells. In some cases, UE 115-*a* may transmit uplink communications 205 to the first base station 105-*a* that may include a measurement report 225.

As discussed herein, in some cases the UE 115-*a* may measure each base station beam 210 (e.g., SSBs from multiple cells at each base station 105) using each UE wide beam 220 in a round robin fashion (e.g., using a first UE wide beam 220-*a*, then using a second UE wide beam 220-*b*, then using a third UE wide beam 220-*c*, and so on). Such a process may take time on the order of hundreds of milliseconds. In some cases, if a particular SSB or cell had a strong signal in the past, but is no longer the best SSB or cell, it can take a relatively long time duration for this information to get reflected in a quality metric database at the UE 115-*a* (e.g., after a cell quality metric degrades there might be stale measurements in the UE 115-*a* database based on previously measured UE wide beams 220). Further, existing implementations provide that the UE 115-*a* may not trigger transmission of a measurement report 225 until all UE beams 220 see quality metrics that satisfy a threshold criteria.

Additionally, if a handover needs to be triggered (e.g., a handover of the UE 115-*a* from the serving cell at the first base station 105-*a* to a target cell at the second base station 105-*b*), the UE 115-*a* may transmit a measurement report considering the best of all measured UE beams 220 irrespective of the staleness of the measurements, which may result in a handover determination based on a high quality measurement that is no longer accurate. In some cases, such late measurement reports 225 or handover to an inferior cell based on a stale measurement may result in a radio link failure (RLF) at the UE 115-*a*, which can cause interrupted communications while a recovery procedure is performed. Further, as discussed herein, measurements of the base station beam 210-*a* using the refined UE beam 215 (e.g., that has higher gain) may result in quality metrics of the serving cell that may appear to be better than quality metrics of a neighboring cell that is measured using a UE wide beam 220 (e.g., that has lower gain). Various techniques provided herein provide for measurement reporting that may reduce late measurement reporting, reduce a number of stale measurements, reduce reporting of measurements made using a higher gain beam, or any combinations thereof, among other things.

Figure 4:
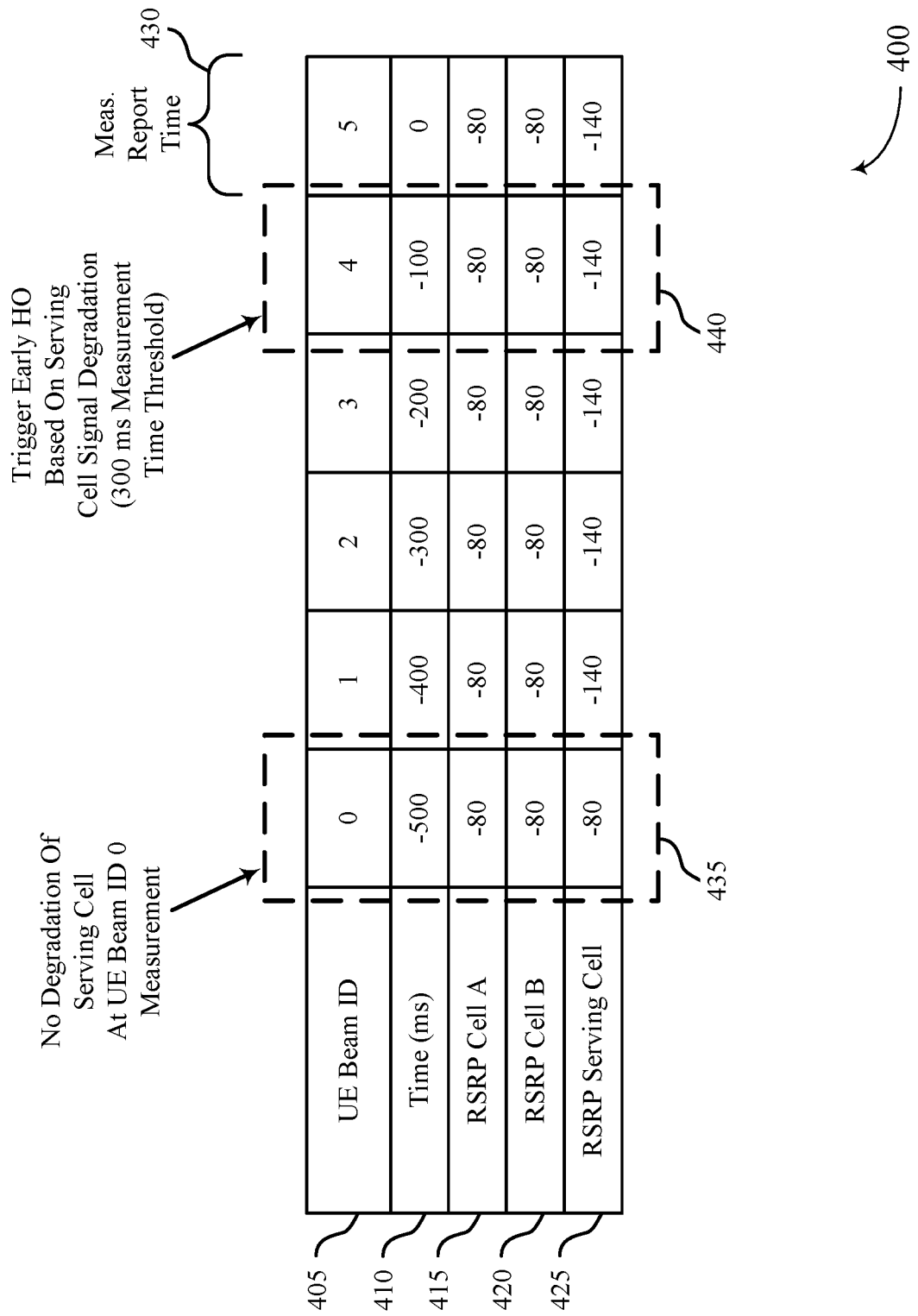

As discussed, the UE 115-*a* may transmit one or more measurement reports 225 to the base station 105-*a* that may be used for a number of purposes, such as handover determination, power control, modulation and coding scheme (MCS) selection, and the like. The one or more measurement reports 225 may include, in some examples, a cell quality metric that provides the best of all UE beam measurements on all measured SSBs of the serving or neighboring cells. Such a cell quality metric may be used, in some cases, for measurement reporting for handover. The one or more measurement reports 225 may also or alternatively include a SSB quality metric that provides the best of all UE beam measurements on CSI-RS or SSB resources of the serving cell. Such a SSB quality metric may be used, in some cases, for layer 1 (L1)-RSRP measurement reporting for a medium access control (MAC) control element (CE)-based SSB switch (e.g., a beam switch at the serving cell). In accordance with various aspects discussed herein, one or more time thresholds may be implemented to provide relatively current quality metric measurements in the one or more measurement reports 225. FIGS. 3 and 4 provide examples of time threshold implementation in measurement reporting.

FIG. 3 illustrates an example of measured quality metrics 300 in accordance with aspects of the present disclosure. In some examples, measured quality metrics 300 may implement aspects of wireless communication system 100 and wireless communications system 200. For example, measured quality metrics 300 may be implemented by a UE 115 and a base station 105 as described with reference to FIGS. 1 and 2.

In this example, a UE may perform quality metric measurements on multiple UE beams 305, identified as UE beam IDs 0 through 5 in FIG. 3. The UE may cycle through each UE beam 305 and perform quality metric measurements. In this example, a time 310 for each measurement is indicated for different UE beam 305 measurements in 100 ms intervals. It is noted that the examples of FIGS. 3 and 4 are provided for purposes of illustration and discussion only, and that numerous other examples of quality metrics and timings for measurements are possible and within the scope of this disclosure. In this example, quality metrics for two neighboring cells (e.g., cell A and cell B) and the serving cell are included. Specifically, the measured quality metrics 300 of this example include RSRP for cell A 315, RSRP for cell B 320, and RSRP for the serving cell 325. In this example, a measurement report time 330 is illustrated for time zero (e.g., based on a trigger or a periodic measurement report), and a handover decision may be made based on the measurement report.

At a first time 335, which in the example of FIG. 3 corresponds to 500 ms prior to the measurement report time 330, the UE measures beam ID 0, which may indicate that cell B is the best cell based on an RSRP of −60 dBm. However, cell B signals may be degrading, as more recent quality metric measurements for UE beam IDs 1 through 4 show degrading RSRP values. Thus, in the absence of any time threshold for including quality metrics, at the measurement report time 330 the measurement report would indicate that cell B has a RSRP of −60 dBm, which is better than any other RSRPs in this example. However, since the signal for cell B degraded, a handover to cell B based on such a measurement report would actually result in a handover to a cell that has quality metrics that have degraded to be below those of cell A.

In accordance with various aspects of the present disclosure, the UE may implement a time threshold for reporting one or more quality metrics. In this example, a time threshold of 300 ms may be provided, corresponding to a second time 340, where older measurements may be excluded from the measurement report. In some cases, the UE may report a timed cell quality metric that provides the best of all UE beam measurements within the past X ms (e.g., 300 ms), on all SSB of the serving or neighbor cell. The UE may also, or alternatively, report a timed SSB quality metric that provides the best of all UE beam measurements within the past X ms (e.g., 300 ms), on CSI-RS or SSB resources of the serving cell. The UE may use the timed cell quality metric or the timed SSB quality metric to trigger a measurement report, resulting in reports being sent earlier in some cases (e.g., when channel conditions are degrading for one or more cells) relative to reporting with no time threshold. In such cases, the best cell or SSB metric included in the report may be based on timed metrics instead of overall metrics, which may prevent handover to an incorrect cell or a beam switch to an incorrect SSB. Thus, in the example of FIG. 3, a 300 ms time threshold for the second time 340 may result in cell A being indicated at the best cell, whereas cell B would have been indicated as the best cell without a time threshold based on the stale measurement at the first time 335.

FIG. 4 illustrates another example of measured quality metrics 400 in accordance with aspects of the present disclosure. In some examples, measured quality metrics 400 may implement aspects of wireless communication system 100 and wireless communications system 200. For example, measured quality metrics 400 may be implemented by a UE 115 and a base station 105 as described with reference to FIGS. 1 and 2.

In this example, a UE again may perform quality metric measurements on multiple UE beams 405, identified as UE beam IDs 0 through 5 in FIG. 4. The UE may cycle through each UE beam 405 and perform quality metric measurements. In this example, a time 410 for each measurement is indicated for different UE beam 405 measurements in 100 ms intervals. In this example, quality metrics for two neighboring cells (e.g., cell A and cell B) and the serving cell are included. Specifically, the measured quality metrics 400 of this example include RSRP for cell A 415, RSRP for cell B 420, and RSRP for the serving cell 425. In this example, a measurement report time 430 is illustrated and would be provided for time zero based on no time threshold (e.g., based on a trigger or a periodic measurement report) and a handover decision may be made based on the measurement report.

In this example, a 300 ms measurement time threshold may be implemented, that may trigger an early measurement report at second time 440 (e.g., based on a degradation of a serving cell RSRP that triggers an A2 or A3 measurement report event). At a first time 435, which in the example of FIG. 4 corresponds to 500 ms prior to the measurement report time 430, the UE measures beam ID 0, which may indicate that all measured cells have a same RSRP of −80 dBm. However, the serving cell in this example experiences a signal degradation starting at the measurement of UE beam ID 1. In the absence of any time threshold for including quality metrics, at the measurement report time 430 the measurement report would indicate that the serving cell has a RSRP of −80 dBm, which would not trigger a handover in this example. However, since the signal for the serving cell has degraded, a handover to either cell A or cell B may be warranted.

In this example, with the measurement time threshold implemented, older measurements may be excluded from the measurement report and trigger conditions for a reporting event. In some cases, at second time 440 the UE may provide a measurement report that indicates the serving cell signal degradation. Thus, in the example of FIG. 4, a 300 ms time threshold may result in an earlier handover of the UE than would have been performed without a time threshold based on the stale measurement at the first time 435.

Figure 5:
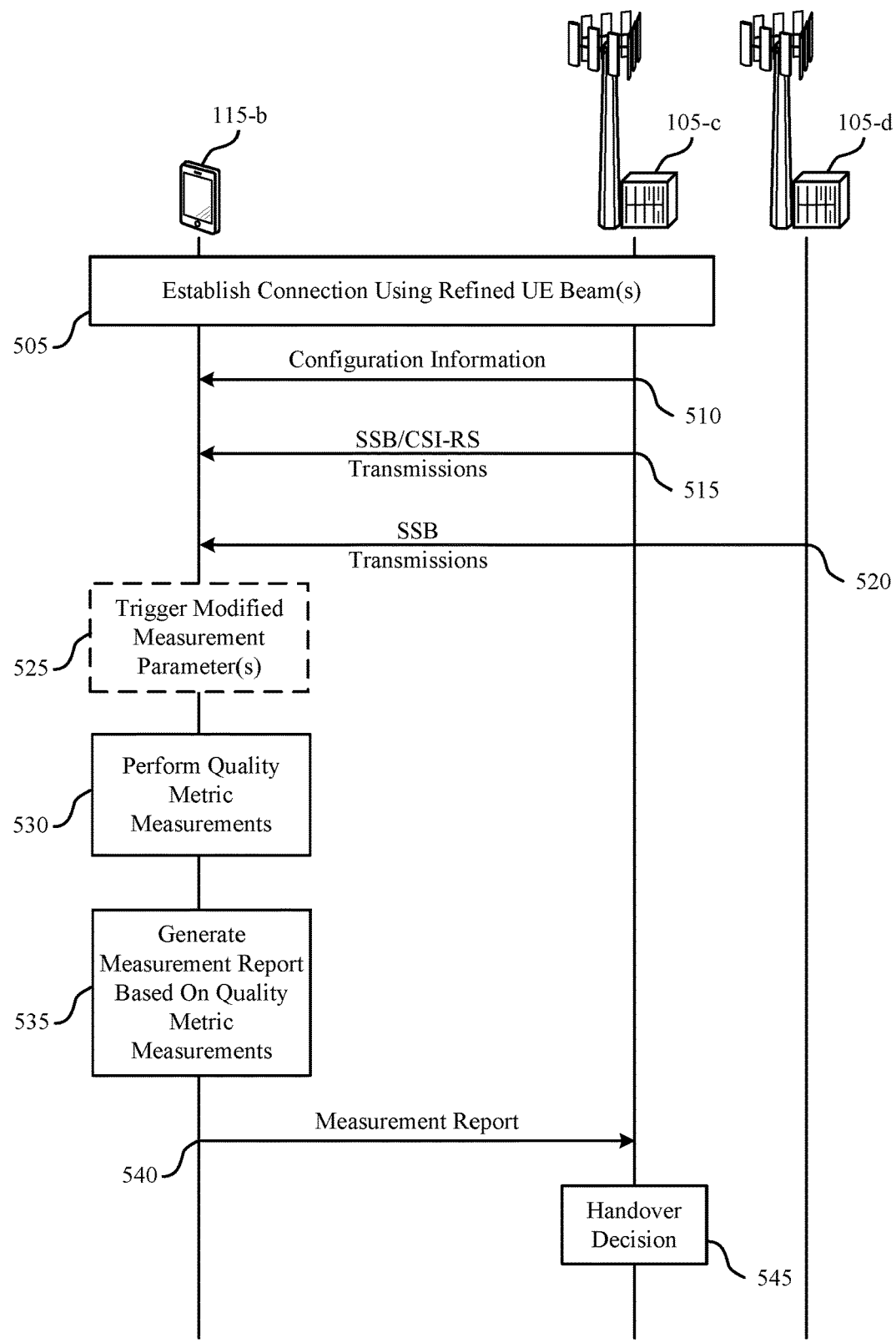
FIG. 5 illustrates an example of a process flow that supports measurement reporting techniques for beamformed communications in accordance with aspects of the present disclosure.

FIG. 5 illustrates an example of a process flow 500 that supports measurement reporting techniques for beamformed communications in accordance with aspects of the present disclosure. In some examples, process flow 500 may implement aspects of wireless communications system 100, or wireless communications system 200. The process flow 500 may illustrate an example of a first base station 105-c, a second base station 105-d, and a UE 115-b and providing measurement reports in accordance with techniques discussed herein. Alternative examples of the following may be implemented, where some processes are performed in a different order than described or are not performed. In some cases, processes may include additional features not mentioned below, or further processes may be added.

At 505, first base station 105-c (e.g., a serving cell or access network entity associated with first base station 105-c) and UE 115-b may establish a connection using one or more refined beams. In some cases, the connection may be established through a random access procedure based on a detected SSB of the first base station 105-c, and a beam training procedure (e.g., P1, P2, P3 procedures) may identify the refined UE beam.

At 510, the first base station 105-a may transmit configuration information to the UE 115-b. In some cases, the configuration information may indicate to the UE 115-b whether to use timed, P0 or overall cell/SSB quality metrics, based on one or more network characteristics. In some cases, the configuration information may also configure parameters such as a time threshold for quality metric measurements. In some cases, the configuration information may be provided in RRC signaling to the UE 115-b. In other cases, additionally or alternatively, the configuration information may be provided in a MAC-CE or in downlink control information. In some cases, the UE 115-b may self-determine one or more quality metric parameters (e.g., a time threshold, whether to use P0 beams for reporting serving cell quality metrics, etc.) based on factors such as, for example, UE speed (e.g., a speed or mobility above a threshold value may indicate a shorter time threshold), a number of UE beams (e.g., that indicates an amount of time between successive measurements of a particular beam), SSB periodicity, or any combinations thereof At 515, the first base station 105-c may transmit one or more SSB or CSI-RS transmissions. Further, at 520, the second base station 105-d may transmit one or more SSB transmissions. The SSB transmissions may be periodic SSB transmissions transmitted in accordance with a SSB periodicity for one or more cells at each of the base stations 105.

Optionally, at 525, the UE 115-b may trigger one or more modified measurement parameters. In some cases, the modified measurement parameters may be based on a time threshold for quality metric measurements (e.g., measurement reports or trigger events may be based only on quality metrics that are within a predetermined time threshold). In some cases, the modified measurement parameters may provide that serving cell measurements are made based on a wide UE beam (e.g., based on P0 beams), such that comparisons between measurements of multiple cells are based on a same beamforming gain. In some cases, when a time threshold is implemented, the UE 115-b may determine a duration of the time threshold based on one or more UE parameters (e.g., UE speed or mobility, number of UE beams, SSB periodicity, etc.).

At 530, the UE 115-b may perform quality metric measurements for the SSBs, CRS-RS transmissions, or any combinations thereof. In some cases, the quality metric measurements may be RSRP measurements, RSRQ measurements, or any combinations thereof, based on one or more reference signals (e.g., based on a CSI-RS, a demodulation reference signal (DMRS) in a physical broadcast channel (PBCH) of the SSBs, etc.). In some cases, the UE 115-b may store the quality metric measurements in a measurement database in which measurements for multiple cells are stored for each of multiple UE beam IDs.

At 535, the UE 115-b may generate a measurement report based on the quality metric measurements. In some cases, the measurement report may include only measurements that are made within a predetermined time threshold (e.g., X ms)

of when the measurement report is generated. In some cases, the measurement report may include a number of measurement elements in accordance with a configuration for measurement reports. In some cases, the measurement report may be triggered by one or more events (e.g., an A1-A6 event) that are detected at the UE 115-*b* (e.g., based on changes of one or more quality metric measurements of one or more cells, such as RSRP thresholds/changes of a serving cell or neighboring cell). At 540, the UE 115-*b* may transmit the measurement report to the first base station 105-*c*. In some cases, based on the configuration information, the UE 115-*b* may include both wide UE beam (e.g., P0) and overall cell quality measurements in the measurement report to better help the first base station 105-*c* (or other network entity) to make a handover decision as indicated at 545.

Figure 6:
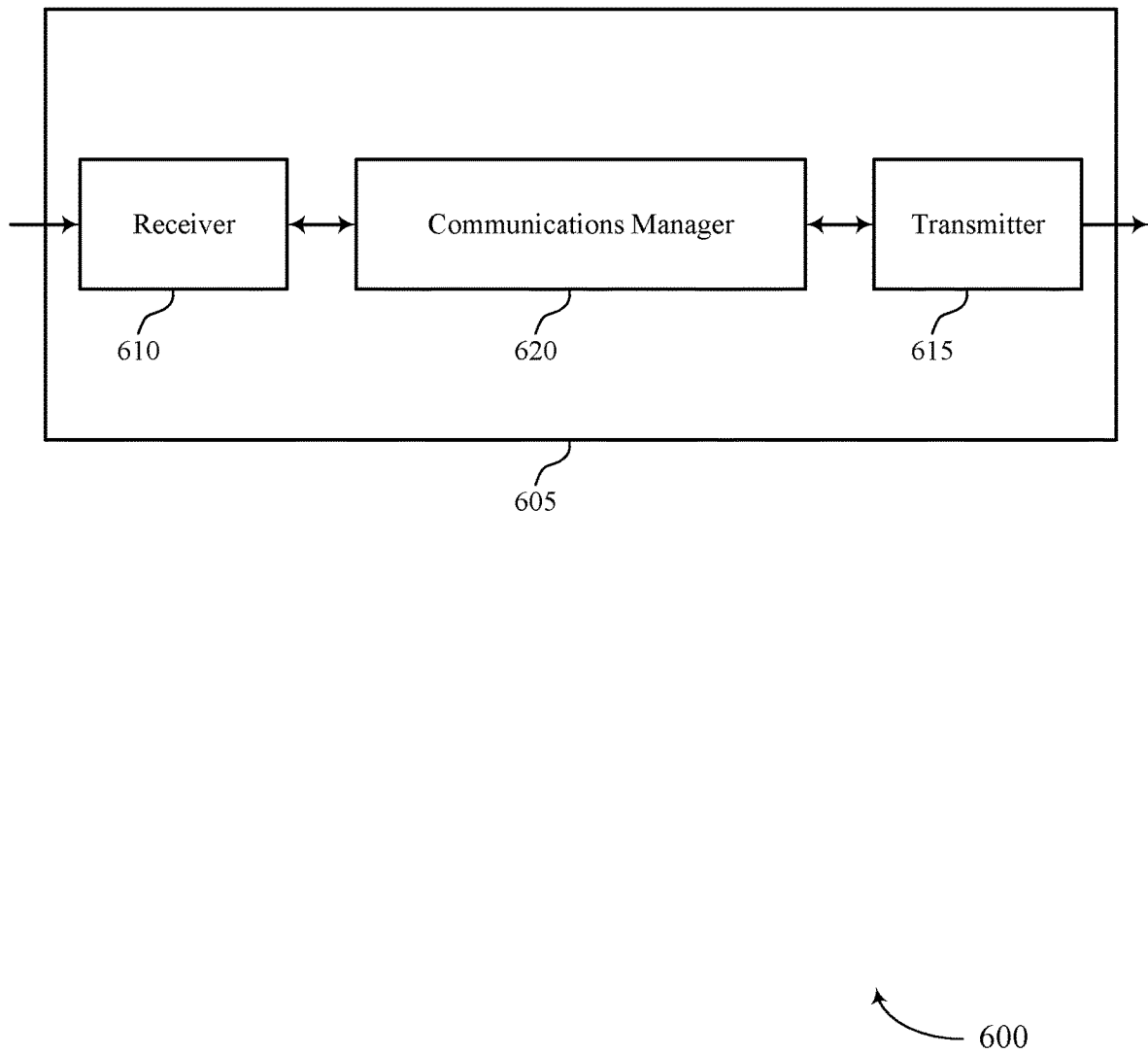
FIGS. 6 and 7 show block diagrams of devices that support measurement reporting techniques for beamformed communications in accordance with aspects of the present disclosure.

FIG. 6 shows a block diagram 600 of a device 605 that supports measurement reporting techniques for beamformed communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to measurement reporting techniques for beamformed communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to measurement reporting techniques for beamformed communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of measurement reporting techniques for beamformed communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for communicating with a first cell using at least a first UE beam, where the first UE beam is a narrower beam than a second UE beam used for a first synchronization signal block that is transmitted by the first cell. The communications manager 620 may be configured as or otherwise support a means for measuring a quality metric of the second UE beam for the first cell and one or more other quality metrics of one or more other UE beams for other synchronization signal blocks of one or more cells including the first cell, one or more neighbor cells, or any combinations thereof The communications manager 620 may be configured as or otherwise support a means for transmitting a measurement report to the first cell based on the quality metric measurements.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for triggering and transmitting measurement reports that provide accurate and timely quality metrics, which may provide for reduced power consumption, more efficient utilization of communication resources, and enhanced communications reliability.

Figure 7:
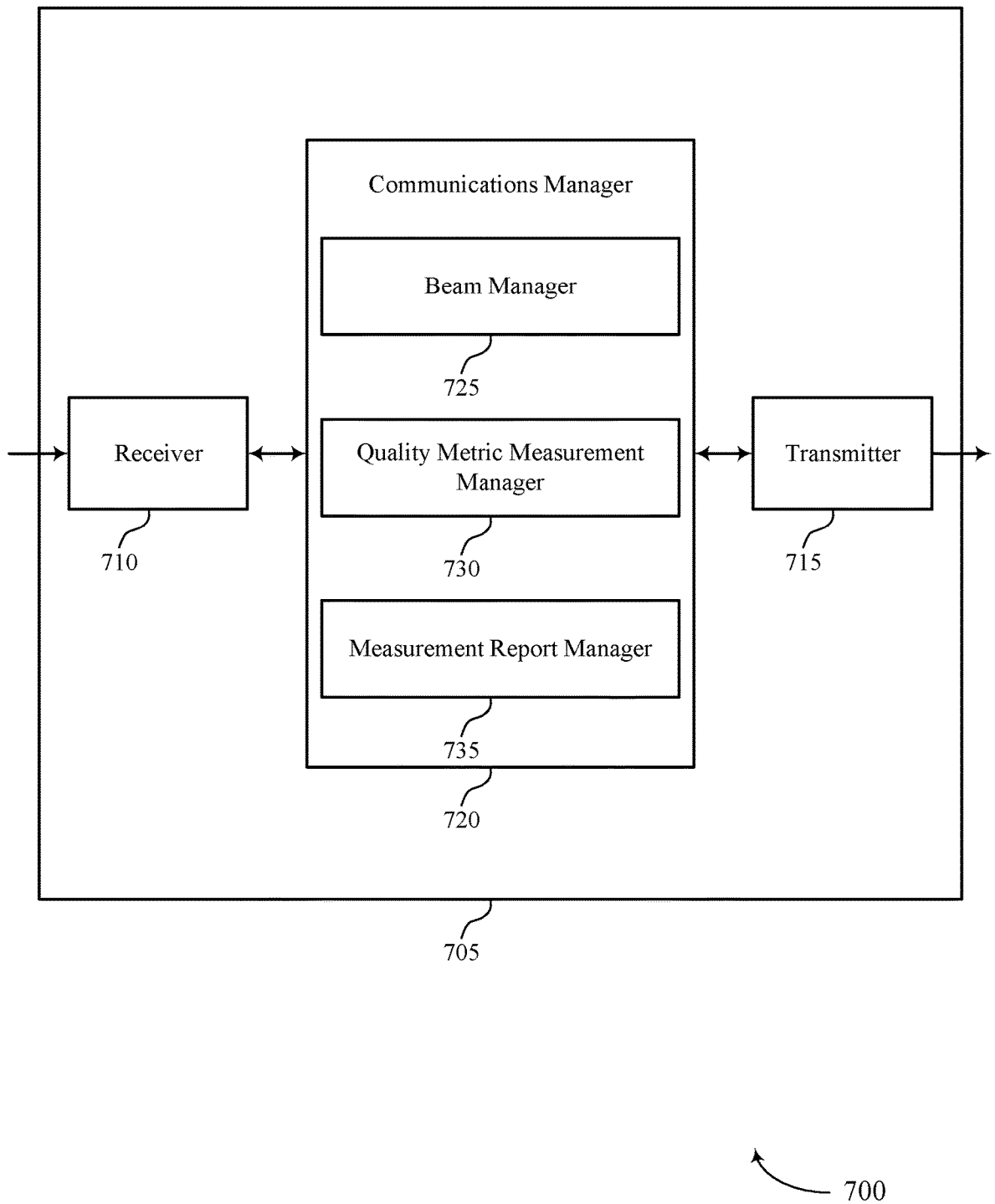

FIG. 7 shows a block diagram 700 of a device 705 that supports measurement reporting techniques for beamformed communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to measurement reporting techniques for beamformed communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to measurement reporting techniques for beamformed communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of measurement reporting techniques for beamformed communications as described herein. For example, the communications manager 720 may include a beam manager 725, a quality metric measurement manager 730, a measurement report manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The beam manager 725 may be configured as or otherwise support a means for communicating with a first cell using at least a first UE beam, where the first UE beam is a narrower beam than a second UE beam used for a first synchronization signal block that is transmitted by the first cell. The quality metric measurement manager 730 may be configured as or otherwise support a means for measuring a quality metric of the second UE beam for the first cell and one or more other quality metrics of one or more other UE beams for other synchronization signal blocks of one or more cells including the first cell, one or more neighbor cells, or any combinations thereof. The measurement report manager 735 may be configured as or otherwise support a means for transmitting a measurement report to the first cell based on the quality metric measurements.

Figure 8:
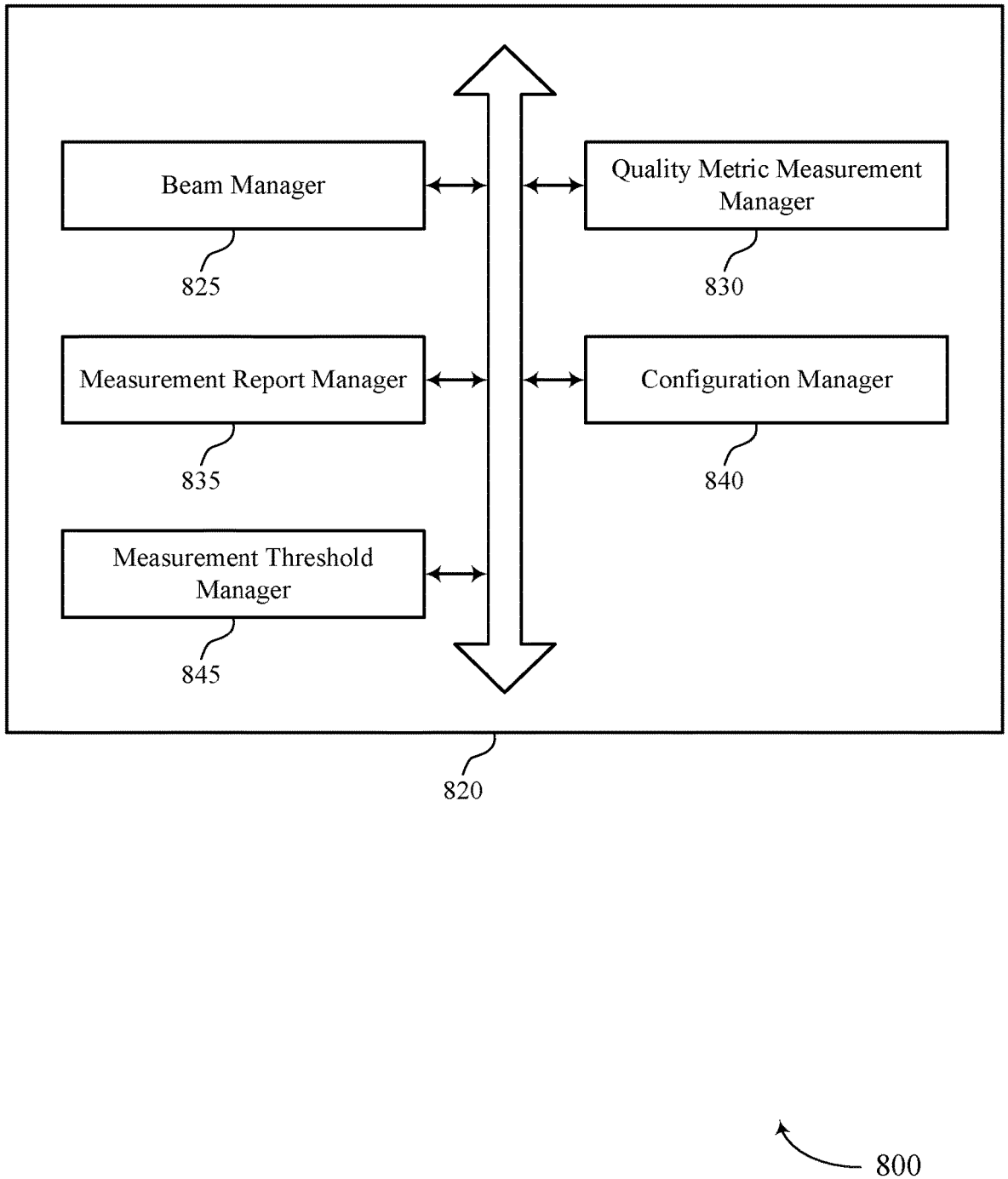
FIG. 8 shows a block diagram of a communications manager that supports measurement reporting techniques for beamformed communications in accordance with aspects of the present disclosure.

FIG. 8 shows a block diagram 800 of a communications manager 820 that supports measurement reporting techniques for beamformed communications in accordance with aspects of the present disclosure. The communications manager 820 may be an example of aspects of a communications manager 620, a communications manager 720, or both, as described herein. The communications manager 820, or various components thereof, may be an example of means for performing various aspects of measurement reporting techniques for beamformed communications as described herein. For example, the communications manager 820 may include a beam manager 825, a quality metric measurement manager 830, a measurement report manager 835, a configuration manager 840, a measurement threshold manager 845, or any combination thereof. Each of these components may communicate, directly or indirectly, with one another (e.g., via one or more buses).

The communications manager 820 may support wireless communication at a UE in accordance with examples as disclosed herein. The beam manager 825 may be configured as or otherwise support a means for communicating with a first cell using at least a first UE beam, where the first UE beam is a narrower beam than a second UE beam used for a first synchronization signal block that is transmitted by the first cell. The quality metric measurement manager 830 may be configured as or otherwise support a means for measuring a quality metric of the second UE beam for the first cell and one or more other quality metrics of one or more other UE beams for other synchronization signal blocks of one or more cells including the first cell, one or more neighbor cells, or any combinations thereof. The measurement report manager 835 may be configured as or otherwise support a means for transmitting a measurement report to the first cell based on the quality metric measurements.

In some examples, to support transmitting the measurement report, the measurement report manager 835 may be configured as or otherwise support a means for generating a measurement report message that includes quality metric measurements that are measured within a predetermined time period prior to generating the measurement report message.

In some examples, the quality metric measurements include a timed cell quality metric that indicates a highest quality synchronization signal block measurement within the predetermined time period for each reported synchronization signal block of the first cell and one or more neighbor cells. In some examples, the quality metric measurements include a timed synchronization signal block quality metric that indicates a highest quality measurement on CSI reference signal resources or synchronization signal block resources of the first cell and one or more neighbor cells.

In some examples, to support transmitting the measurement report, the measurement threshold manager 845 may be configured as or otherwise support a means for determining that one or more measurements within the predetermined time period cross a threshold value for triggering the measurement report. In some examples, one or more quality metric measurements obtained prior to the predetermined time period are excluded from the measurement report message. In some examples, the transmitting the measurement report based on the second beam of the first cell prompts an earlier transmission of the measurement report relative to a measurement report that is based on a quality metric measurement of the first beam.

In some examples, the configuration manager 840 may be configured as or otherwise support a means for receiving, from the first cell, configuration information that enables usage of the quality metric of the second beam for triggering the transmission of the measurement report. In some examples, the configuration information includes time threshold information for including quality metric measurements in the measurement report.

In some examples, the configuration manager 840 may be configured as or otherwise support a means for determining, based on one or more parameters provided in the configuration information, a time threshold for including quality metric measurements in the measurement report. In some examples, the one or more parameters include one or more of a measured mobility of the UE, a number of active UE beams, a periodicity of synchronization signal block transmissions, or any combinations thereof. In some examples, the measurement report includes the quality metric of the first synchronization signal block and one or more quality metrics associated with the first UE beam.

Figure 9:
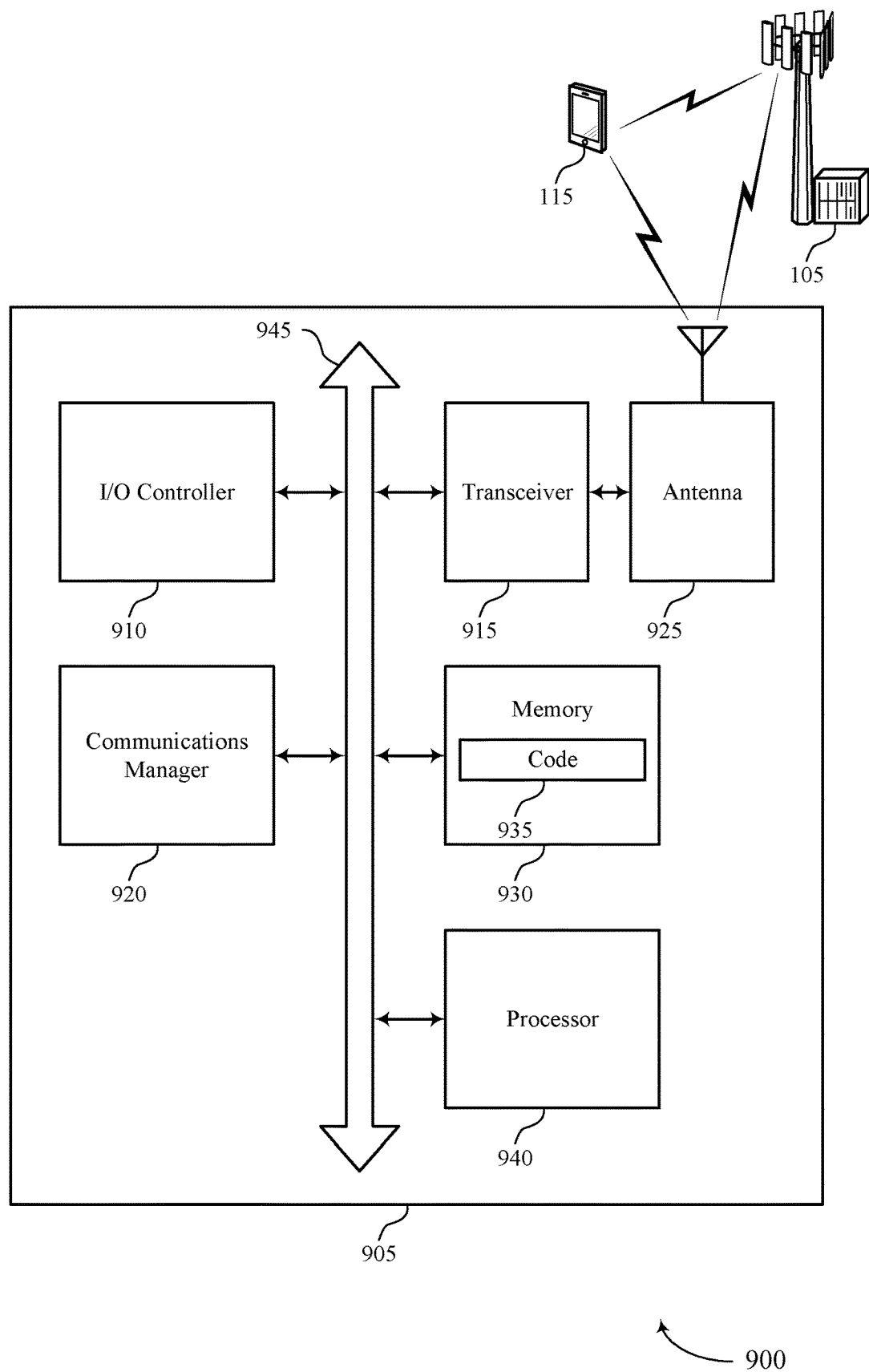
FIG. 9 shows a diagram of a system including a device that supports measurement reporting techniques for beamformed communications in accordance with aspects of the present disclosure.

FIG. 9 shows a diagram of a system 900 including a device 905 that supports measurement reporting techniques for beamformed communications in accordance with aspects of the present disclosure. The device 905 may be an example of or include the components of a device 605, a device 705, or a UE 115 as described herein. The device 905 may communicate wirelessly with one or more access network entities, base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting measurement reporting techniques for beamformed communications). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for communicating with a first cell using at least a first UE beam, where the first UE beam is a narrower beam than a second UE beam used for a first synchronization signal block that is transmitted by the first cell. The communications manager 920 may be configured as or otherwise support a means for measuring a quality metric of the second UE beam for the first cell and one or more other quality metrics of one or more other UE beams for other synchronization signal blocks of one or more cells including the first cell, one or more neighbor cells, or any combinations thereof. The communications manager 920 may be configured as or otherwise support a means for transmitting a measurement report to the first cell based on the quality metric measurements.

By including or configuring the communications manager 920 in accordance with examples as described herein, the device 905 may support techniques for triggering and transmitting measurement reports that provide accurate and timely quality metrics, which may provide for reduced power consumption, more efficient utilization of communication resources, reduced latency, improved coordination between devices, longer battery life, and enhanced communications reliability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of measurement reporting techniques for beamformed communications as described herein, or the processor 940 and the memory 930 may be otherwise configured to perform or support such operations.

Figure 10:
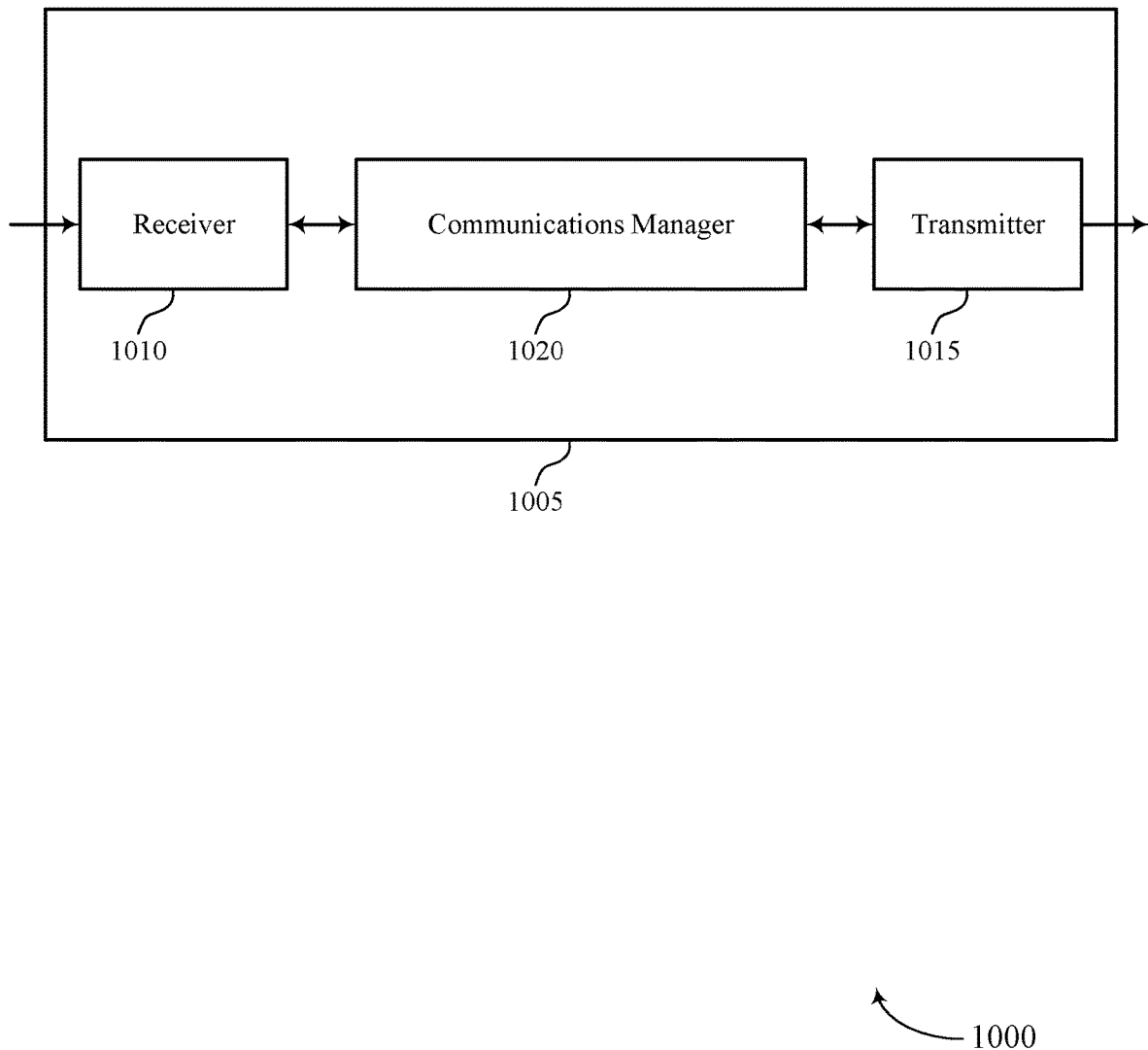
FIGS. 10 and 11 show block diagrams of devices that support measurement reporting techniques for beamformed communications in accordance with aspects of the present disclosure.

FIG. 10 shows a block diagram 1000 of a device 1005 that supports measurement reporting techniques for beamformed communications in accordance with aspects of the present disclosure. The device 1005 may be an example of aspects of an access network entity or base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to measurement reporting techniques for beamformed communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to measurement reporting techniques for beamformed communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of measurement reporting techniques for beamformed communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at an access network entity in accordance with examples as disclosed herein. For example, the communications manager 1020 may be configured as or otherwise support a means for communicating with a UE via a first cell using at least a first UE beam, where the first UE beam is a narrower beam than a second UE beam used for a first synchronization signal block that is transmitted by the first cell. The communications manager 1020 may be configured as or otherwise support a means for configuring the UE to transmit a measurement report based on a quality metric of the second UE beam of the first cell and one or more other quality metrics of one or more other UE beams for synchronization signal blocks of one or more cells including the first cell, one or more neighbor cells, or any combinations thereof. The communications manager 1020 may be configured as or otherwise support a means for receiving the measurement report from the UE.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for triggering and transmitting measurement reports that provide accurate and timely quality metrics, which may provide for reduced power consumption, more efficient utilization of communication resources, and enhanced communications reliability.

Figure 11:
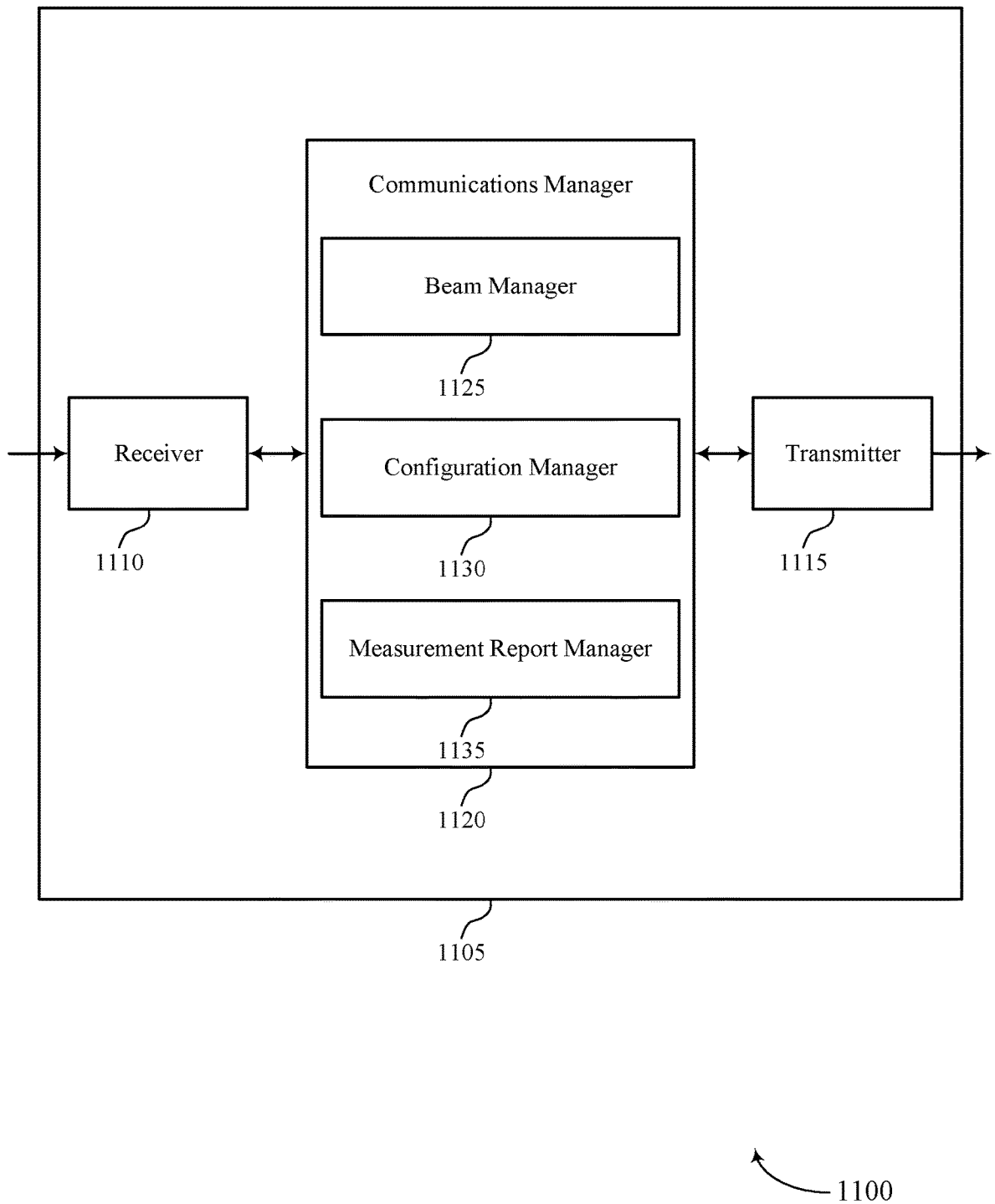

FIG. 11 shows a block diagram 1100 of a device 1105 that supports measurement reporting techniques for beamformed communications in accordance with aspects of the present disclosure. The device 1105 may be an example of aspects of a device 1005 or an access network entity or base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to measurement reporting techniques for beamformed communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to measurement reporting techniques for beamformed communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of measurement reporting techniques for beamformed communications as described herein. For example, the communications manager 1120 may include a beam manager 1125, a configuration manager 1130, a measurement report manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at an access network entity in accordance with examples as disclosed herein. The beam manager 1125 may be configured as or otherwise support a means for communicating with a UE via a first cell using at least a first UE beam, where the first UE beam is a narrower beam than a second UE beam used for a first synchronization signal block that is transmitted by the first cell. The configuration manager 1130 may be configured as or otherwise support a means for configuring the UE to transmit a measurement report based on a quality metric of the second UE beam of the first cell and one or more other quality metrics of one or more other UE beams for synchronization signal blocks of one or more cells including the first cell, one or more neighbor cells, or any combinations thereof. The measurement report manager 1135 may be configured as or otherwise support a means for receiving the measurement report from the UE.

Figure 12:
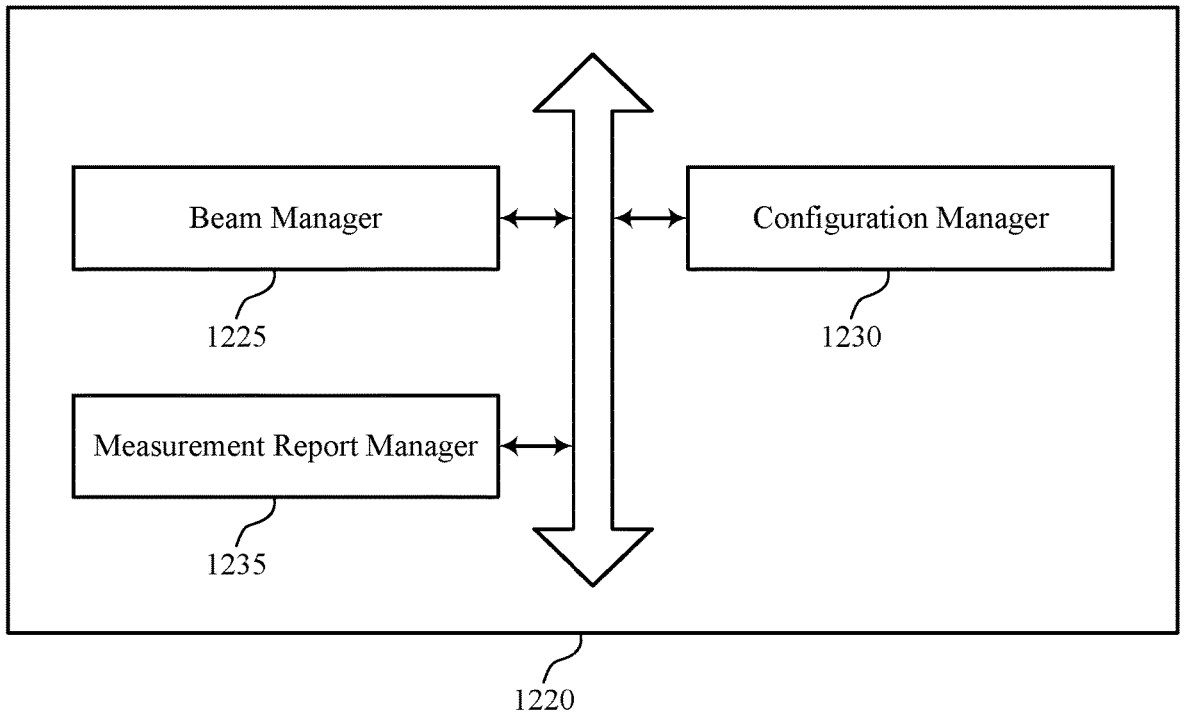
FIG. 12 shows a block diagram of a communications manager that supports measurement reporting techniques for beamformed communications in accordance with aspects of the present disclosure.

FIG. 12 shows a block diagram 1200 of a communications manager 1220 that supports measurement reporting techniques for beamformed communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of measurement reporting techniques for beamformed communications as described herein. For example, the communications manager 1220 may include a beam manager 1225, a configuration manager 1230, a measurement report manager 1235, or any combination thereof. Each of these components may communicate, directly or indirectly, with one another (e.g., via one or more buses).

The communications manager 1220 may support wireless communication at an access network entity in accordance with examples as disclosed herein. The beam manager 1225 may be configured as or otherwise support a means for communicating with a UE via a first cell using at least a first UE beam, where the first UE beam is a narrower beam than a second UE beam used for a first synchronization signal block that is transmitted by the first cell. The configuration manager 1230 may be configured as or otherwise support a means for configuring the UE to transmit a measurement report based on a quality metric of the second UE beam of the first cell and one or more other quality metrics of one or more other UE beams for synchronization signal blocks of one or more cells including the first cell, one or more neighbor cells, or any combinations thereof. The measurement report manager 1235 may be configured as or otherwise support a means for receiving the measurement report from the UE.

In some examples, the measurement report includes quality metric measurements that are measured within a predetermined time period prior to generating the measurement report. In some examples, the quality metric measurements include a timed cell quality metric that indicates a highest quality synchronization signal block measurement within the predetermined time period for each reported synchronization signal block of the first cell and one or more neighbor cells. In some examples, the quality metric measurements include a timed synchronization signal block quality metric that indicates a highest quality measurement on CSI reference signal resources or synchronization signal block resources of the first cell and one or more neighbor cells.

In some examples, to support configuring the UE, the configuration manager 1230 may be configured as or otherwise support a means for transmitting configuration information to the UE that indicates the UE is to exclude one or more quality metric measurements obtained prior to the predetermined time period from the measurement report. In some examples, the configuration information includes time threshold information for including quality metric measurements in the measurement report.

In some examples, the configuration manager 1230 may be configured as or otherwise support a means for the configuration information includes one or more parameters for determining a time threshold for including quality metric measurements in the measurement report. In some examples, the one or more parameters include one or more of a measured mobility of the UE, a number of active UE beams, a periodicity of synchronization signal block transmissions, or any combinations thereof. In some examples, the measurement report includes the quality metric of the first synchronization signal block and one or more quality metrics associated with the first UE beam.

Figure 13:
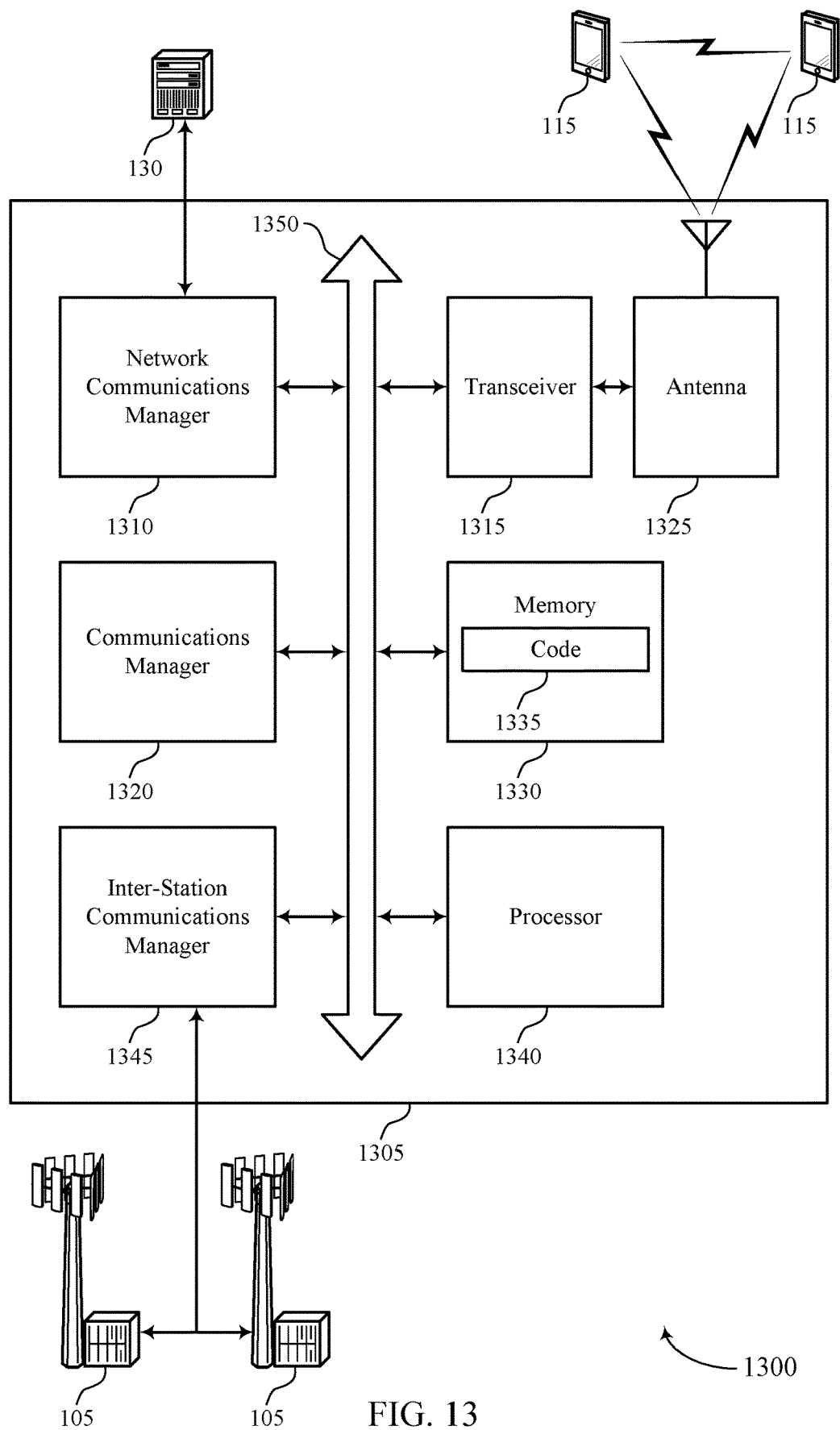
FIG. 13 shows a diagram of a system including a device that supports measurement reporting techniques for beamformed communications in accordance with aspects of the present disclosure.

FIG. 13 shows a diagram of a system 1300 including a device 1305 that supports measurement reporting techniques for beamformed communications in accordance with aspects of the present disclosure. The device 1305 may be an example of or include the components of a device 1005, a device 1105, or an access network entity or base station 105 as described herein. The device 1305 may communicate wirelessly with one or more access network entities or base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting measurement reporting techniques for beamformed communications). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at an access network entity in accordance with examples as disclosed herein. For example, the communications manager 1320 may be configured as or otherwise support a means for communicating with a UE via a first cell using at least a first UE beam, where the first UE beam is a narrower beam than a second UE beam used for a first synchronization signal block that is transmitted by the first cell. The communications manager 1320 may be configured as or otherwise support a means for configuring the UE to transmit a measurement report based on a quality metric of the second UE beam of the first cell and one or more other quality metrics of one or more other UE beams for synchronization signal blocks of one or more cells including the first cell, one or more neighbor cells, or any combinations thereof. The communications manager 1320 may be configured as or otherwise support a means for receiving the measurement report from the UE.

By including or configuring the communications manager 1320 in accordance with examples as described herein, the device 1305 may support techniques for triggering and transmitting measurement reports that provide accurate and timely quality metrics, which may provide for reduced power consumption, more efficient utilization of communication resources, reduced latency, improved coordination between devices, longer battery life, and enhanced communications reliability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of measurement reporting techniques for beamformed communications as described herein, or the processor 1340 and the memory 1330 may be otherwise configured to perform or support such operations.

Figure 14:
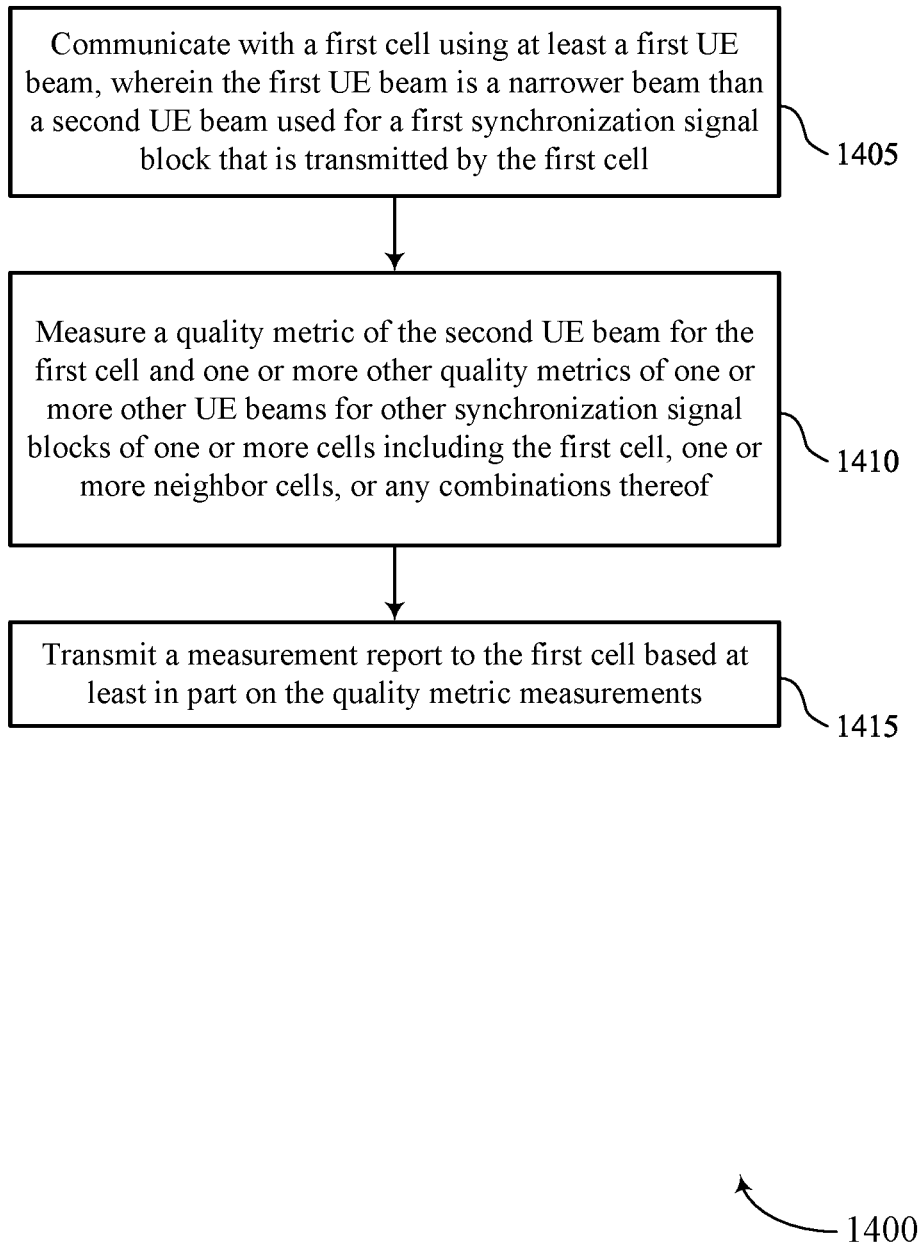
FIGS. 14 through 18 show flowcharts illustrating methods that support measurement reporting techniques for beamformed communications in accordance with aspects of the present disclosure.

FIG. 14 shows a flowchart illustrating a method 1400 that supports measurement reporting techniques for beamformed communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include communicating with a first cell using at least a first UE beam, where the first UE beam is a narrower beam than a second UE beam used for a first synchronization signal block that is transmitted by the first cell. The operations of 1405 may be performed in accordance with examples as disclosed herein. In some examples, aspects of the operations of 1405 may be performed by a beam manager 825 as described with reference to FIG. 8.

At 1410, the method may include measuring a quality metric of the second UE beam for the first cell and one or more other quality metrics of one or more other UE beams for other synchronization signal blocks of one or more cells including the first cell, one or more neighbor cells, or any combinations thereof. The operations of 1410 may be performed in accordance with examples as disclosed herein. In some examples, aspects of the operations of 1410 may be performed by a quality metric measurement manager 830 as described with reference to FIG. 8.

At 1415, the method may include transmitting a measurement report to the first cell based on the quality metric measurements. The operations of 1415 may be performed in accordance with examples as disclosed herein. In some examples, aspects of the operations of 1415 may be performed by a measurement report manager 835 as described with reference to FIG. 8.

Figure 15:
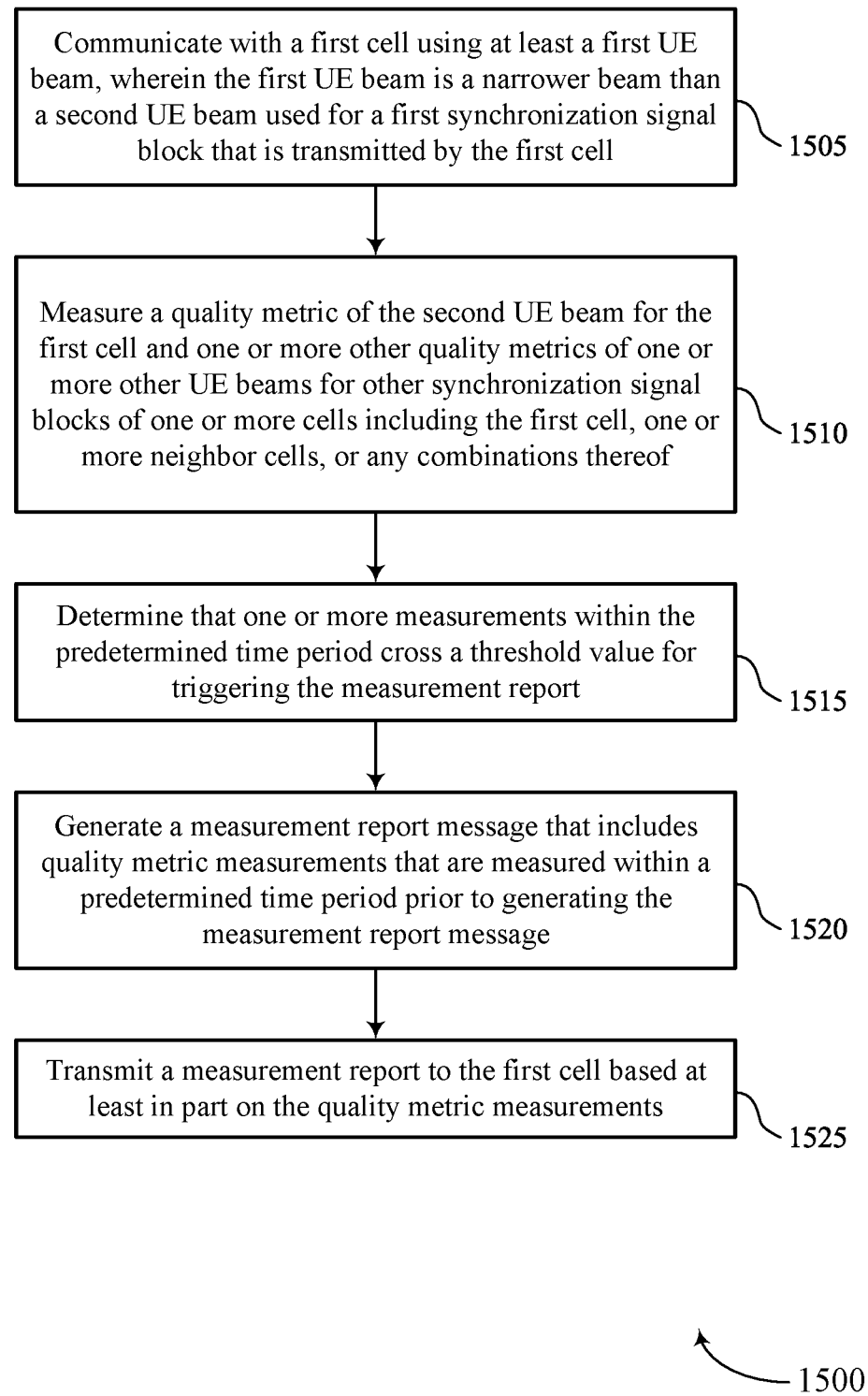

FIG. 15 shows a flowchart illustrating a method 1500 that supports measurement reporting techniques for beamformed communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include communicating with a first cell using at least a first UE beam, where the first UE beam is a narrower beam than a second UE beam used for a first synchronization signal block that is transmitted by the first cell. The operations of 1505 may be performed in accordance with examples as disclosed herein. In some examples, aspects of the operations of 1505 may be performed by a beam manager 825 as described with reference to FIG. 8.

At 1510, the method may include measuring a quality metric of the second UE beam for the first cell and one or more other quality metrics of one or more other UE beams for other synchronization signal blocks of one or more cells including the first cell, one or more neighbor cells, or any combinations thereof. The operations of 1510 may be performed in accordance with examples as disclosed herein. In some examples, aspects of the operations of 1510 may be performed by a quality metric measurement manager 830 as described with reference to FIG. 8.

At 1515, the method may include determining that one or more measurements within the predetermined time period cross a threshold value for triggering the measurement report. The operations of 1515 may be performed in accordance with examples as disclosed herein. In some examples, aspects of the operations of 1515 may be performed by a measurement threshold manager 845 as described with reference to FIG. 8.

At 1520, the method may include generating a measurement report message that includes quality metric measurements that are measured within a predetermined time period prior to generating the measurement report message. The operations of 1520 may be performed in accordance with examples as disclosed herein. In some examples, aspects of the operations of 1520 may be performed by a measurement report manager 835 as described with reference to FIG. 8.

At 1525, the method may include transmitting a measurement report to the first cell based on the quality metric measurements. The operations of 1525 may be performed in accordance with examples as disclosed herein. In some examples, aspects of the operations of 1525 may be performed by a measurement report manager 835 as described with reference to FIG. 8.

Figure 16:
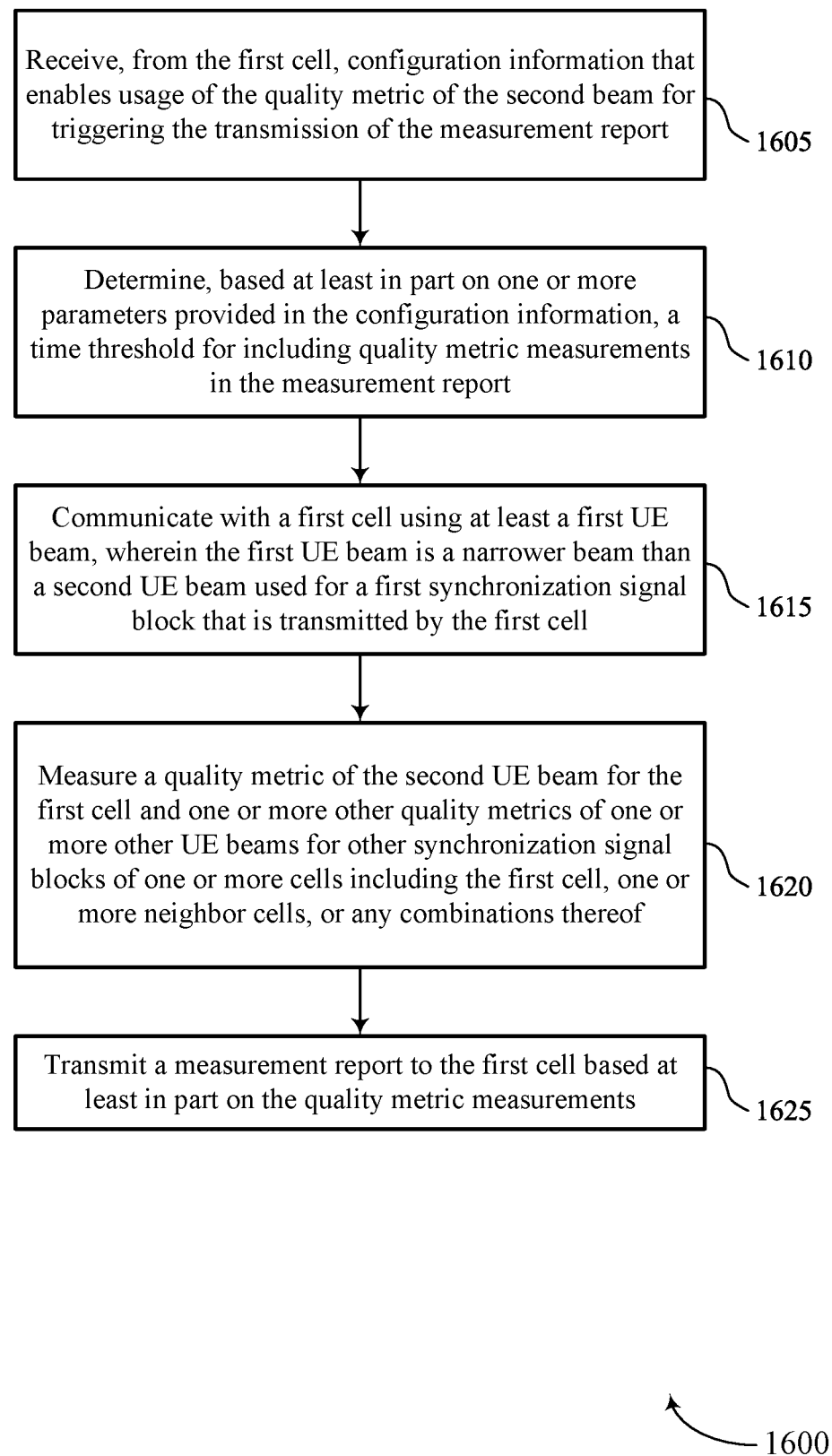

FIG. 16 shows a flowchart illustrating a method 1600 that supports measurement reporting techniques for beamformed communications in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from the first cell, configuration information that enables usage of the quality metric of the second beam for triggering the transmission of the measurement report. The operations of 1605 may be performed in accordance with examples as disclosed herein. In some examples, aspects of the operations of 1605 may be performed by a configuration manager 840 as described with reference to FIG. 8. In some cases, the configuration information includes time threshold information for including quality metric measurements in the measurement report.

At 1610, the method may include determining, based on one or more parameters provided in the configuration information, a time threshold for including quality metric measurements in the measurement report. The operations of 1610 may be performed in accordance with examples as disclosed herein. In some examples, aspects of the operations of 1610 may be performed by a configuration manager 840 as described with reference to FIG. 8.

At 1615, the method may include communicating with a first cell using at least a first UE beam, where the first UE beam is a narrower beam than a second UE beam used for a first synchronization signal block that is transmitted by the first cell. The operations of 1615 may be performed in accordance with examples as disclosed herein. In some examples, aspects of the operations of 1615 may be performed by a beam manager 825 as described with reference to FIG. 8.

At 1620, the method may include measuring a quality metric of the second UE beam for the first cell and one or more other quality metrics of one or more other UE beams for other synchronization signal blocks of one or more cells including the first cell, one or more neighbor cells, or any combinations thereof. The operations of 1620 may be performed in accordance with examples as disclosed herein. In some examples, aspects of the operations of 1620 may be performed by a quality metric measurement manager 830 as described with reference to FIG. 8.

At 1625, the method may include transmitting a measurement report to the first cell based on the quality metric measurements. The operations of 1625 may be performed in accordance with examples as disclosed herein. In some examples, aspects of the operations of 1625 may be performed by a measurement report manager 835 as described with reference to FIG. 8.

Figure 17:
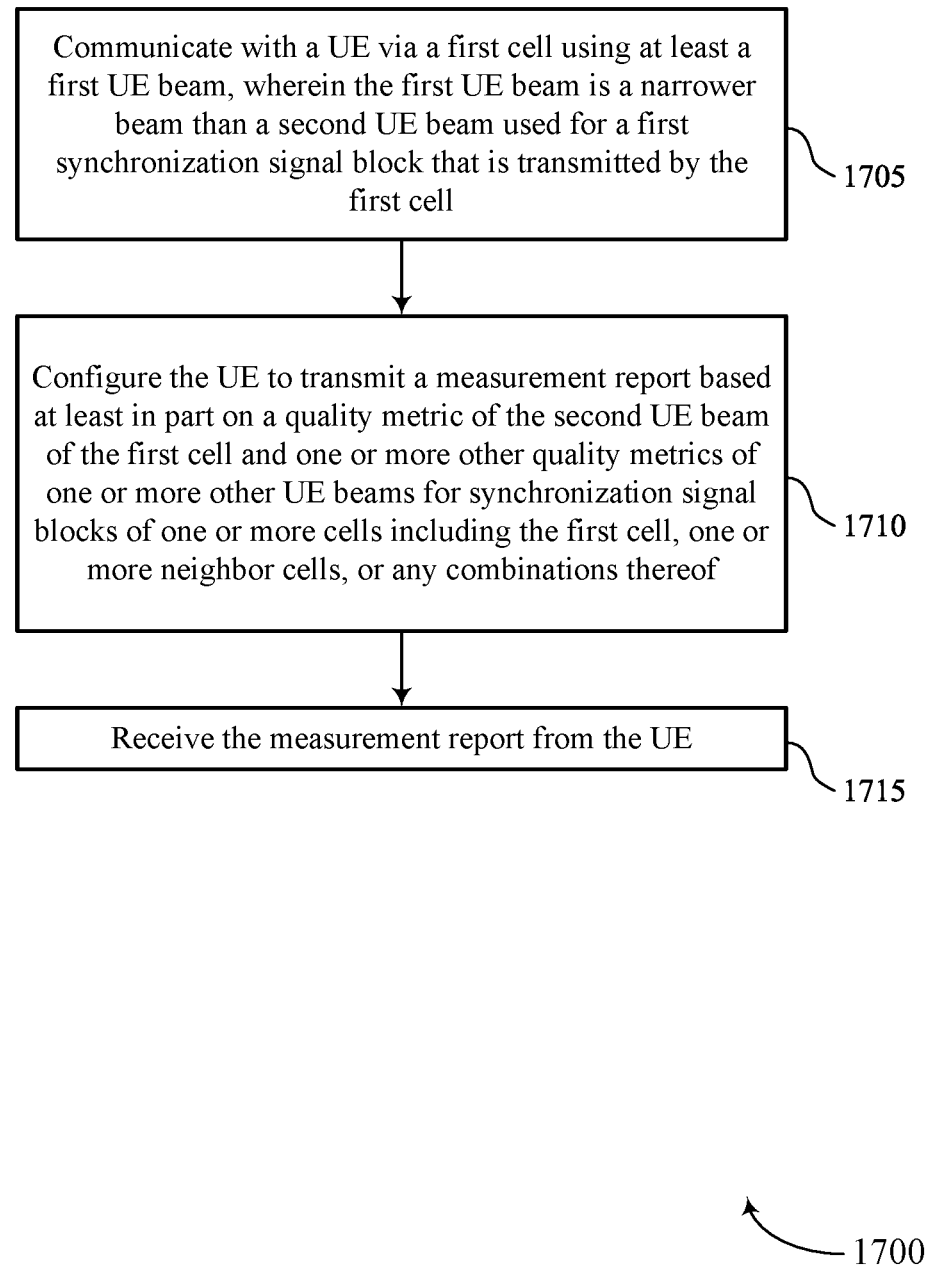

FIG. 17 shows a flowchart illustrating a method 1700 that supports measurement reporting techniques for beamformed communications in accordance with aspects of the present disclosure. The operations of the method 1700 may be implemented by an access network entity or base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include communicating with a UE via a first cell using at least a first UE beam, where the first UE beam is a narrower beam than a second UE beam used for a first synchronization signal block that is transmitted by the first cell. The operations of 1705 may be performed in accordance with examples as disclosed herein.

In some examples, aspects of the operations of 1705 may be performed by a beam manager 1225 as described with reference to FIG. 12.

At 1710, the method may include configuring the UE to transmit a measurement report based on a quality metric of the second UE beam of the first cell and one or more other quality metrics of one or more other UE beams for synchronization signal blocks of one or more cells including the first cell, one or more neighbor cells, or any combinations thereof. The operations of 1710 may be performed in accordance with examples as disclosed herein. In some examples, aspects of the operations of 1710 may be performed by a configuration manager 1230 as described with reference to FIG. 12.

At 1715, the method may include receiving the measurement report from the UE. The operations of 1715 may be performed in accordance with examples as disclosed herein. In some examples, aspects of the operations of 1715 may be performed by a measurement report manager 1235 as described with reference to FIG. 12.

Figure 18:
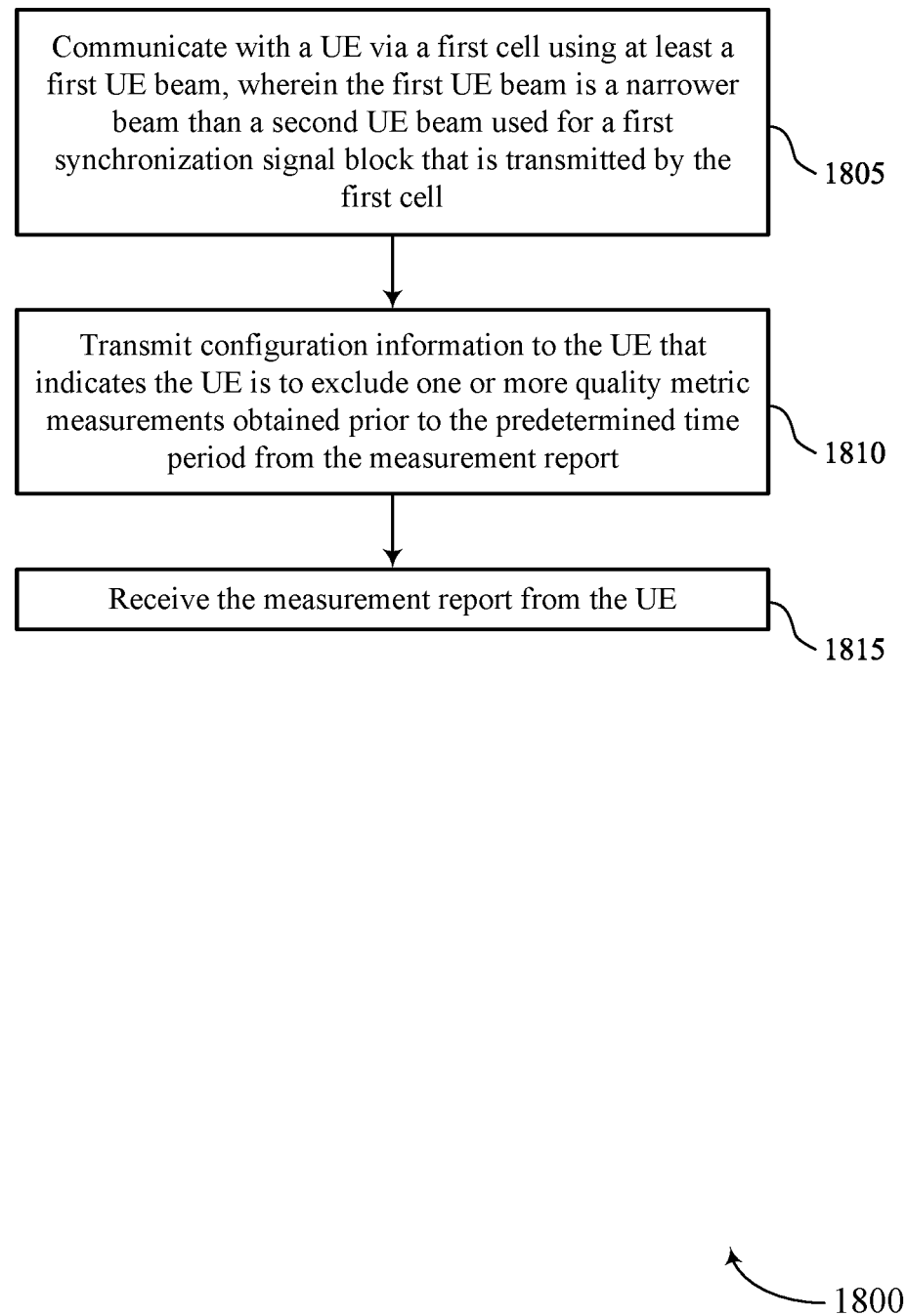

FIG. 18 shows a flowchart illustrating a method 1800 that supports measurement reporting techniques for beamformed communications in accordance with aspects of the present disclosure. The operations of the method 1800 may be implemented by an access network entity or base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include communicating with a UE via a first cell using at least a first UE beam, where the first UE beam is a narrower beam than a second UE beam used for a first synchronization signal block that is transmitted by the first cell. The operations of 1805 may be performed in accordance with examples as disclosed herein. In some examples, aspects of the operations of 1805 may be performed by a beam manager 1225 as described with reference to FIG. 12.

At 1810, the method may include transmitting configuration information to the UE that indicates the UE is to exclude one or more quality metric measurements obtained prior to the predetermined time period from the measurement report. The operations of 1810 may be performed in accordance with examples as disclosed herein. In some examples, aspects of the operations of 1810 may be performed by a configuration manager 1230 as described with reference to FIG. 12. In some cases, the configuration information includes time threshold information for including quality metric measurements in the measurement report. In some cases, the configuration information includes one or more parameters for determining a time threshold for including quality metric measurements in the measurement report. In some cases, the configuration may indicate that the UE is to transmit a measurement report based on a quality metric of the second UE beam of the first cell and one or more other quality metrics of one or more other UE beams for synchronization signal blocks of one or more cells including the first cell, one or more neighbor cells, or any combinations thereof At 1815, the method may include receiving the measurement report from the UE. The operations of 1815 may be performed in accordance with examples as disclosed herein. In some examples, aspects of the operations of 1815 may be performed by a measurement report manager 1235 as described with reference to FIG. 12. In some cases, the measurement report includes quality metric measurements that are measured within a predetermined time period prior to generating the measurement report.

The following provides an overview of aspects of the present disclosure:

Aspect 1: A method for wireless communication at a UE, comprising: communicating with a first cell using at least a first UE beam, wherein the first UE beam is a narrower beam than a second UE beam used for a first synchronization signal block that is transmitted by the first cell; measuring a quality metric of the second UE beam for the first cell, and one or more other quality metrics of one or more other UE beams for other synchronization signal blocks of one or more cells including the first cell, one or more neighbor cells, or any combinations thereof; and transmitting a measurement report to the first cell based at least in part on the quality metric measurements.

Aspect 2: The method of aspect 1, wherein the transmitting the measurement report comprises: generating a measurement report message that includes quality metric measurements that are measured within a predetermined time period prior to generating the measurement report message.

Aspect 3: The method of aspect 2, wherein the quality metric measurements include a timed cell quality metric that indicates a highest quality synchronization signal block measurement within the predetermined time period for each reported synchronization signal block of the first cell and one or more neighbor cells.

Aspect 4: The method of any of aspects 2 through 3, wherein the quality metric measurements include a timed synchronization signal block quality metric that indicates a highest quality measurement on CSI reference signal resources or synchronization signal block resources of the first cell and one or more neighbor cells.

Aspect 5: The method of any of aspects 2 through 4, wherein the transmitting the measurement report further comprises: determining that one or more measurements within the predetermined time period cross a threshold value for triggering the measurement report.

Aspect 6: The method of any of aspects 2 through 5, wherein one or more quality metric measurements obtained prior to the predetermined time period are excluded from the measurement report message.

Aspect 7: The method of any of aspects 1 through 6, wherein the transmitting the measurement report based at least in part on the second beam of the first cell prompts an earlier transmission of the measurement report relative to a measurement report that is based on a quality metric measurement of the first beam.

Aspect 8: The method of any of aspects 1 through 7, further comprising: receiving, from the first cell, configuration information that enables usage of the quality metric of the second beam for triggering the transmission of the measurement report.

Aspect 9: The method of aspect 8, wherein the configuration information includes time threshold information for including quality metric measurements in the measurement report.

Aspect 10: The method of aspect 9, further comprising: determining, based at least in part on one or more parameters provided in the configuration information, a time threshold for including quality metric measurements in the measurement report.

Aspect 11: The method of aspect 10, wherein the one or more parameters include one or more of a measured mobility of the UE, a number of active UE beams, a periodicity of synchronization signal block transmissions, or any combinations thereof.

Aspect 12: The method of any of aspects 1 through 11, wherein the measurement report includes the quality metric of the first synchronization signal block and one or more quality metrics associated with the first UE beam.

Aspect 13: A method for wireless communication at an access network entity, comprising: communicating with a UE via a first cell using at least a first UE beam, wherein the first UE beam is a narrower beam than a second UE beam used for a first synchronization signal block that is transmitted by the first cell; configuring the UE to transmit a measurement report based at least in part on a quality metric of the second UE beam of the first cell and one or more other quality metrics of one or more other UE beams for synchronization signal blocks of one or more cells including the first cell, one or more neighbor cells, or any combinations thereof and receiving the measurement report from the UE.

Aspect 14: The method of aspect 13, wherein the measurement report includes quality metric measurements that are measured within a predetermined time period prior to generating the measurement report.

Aspect 15: The method of aspect 14, wherein the quality metric measurements include a timed cell quality metric that indicates a highest quality synchronization signal block measurement within the predetermined time period for each reported synchronization signal block of the first cell and one or more neighbor cells.

Aspect 16: The method of any of aspects 14 through 15, wherein the quality metric measurements include a timed synchronization signal block quality metric that indicates a highest quality measurement on CSI reference signal resources or synchronization signal block resources of the first cell and one or more neighbor cells.

Aspect 17: The method of any of aspects 14 through 16, wherein the configuring the UE further comprises: transmitting configuration information to the UE that indicates the UE is to exclude one or more quality metric measurements obtained prior to the predetermined time period from the measurement report.

Aspect 18: The method of aspect 17, wherein the configuration information includes time threshold information for including quality metric measurements in the measurement report.

Aspect 19: The method of aspect 18, further comprising: the configuration information includes one or more parameters for determining a time threshold for including quality metric measurements in the measurement report.

Aspect 20: The method of aspect 19, wherein the one or more parameters include one or more of a measured mobility of the UE, a number of active UE beams, a periodicity of synchronization signal block transmissions, or any combinations thereof Aspect 21: The method of any of aspects 13 through 20, wherein the measurement report includes the quality metric of the first synchronization signal block and one or more quality metrics associated with the first UE beam.

Aspect 22: An apparatus for wireless communication at a UE, comprising a processor; memory coupled with the processor; and instructions stored in the memory and executable by the processor to cause the apparatus to perform a method of any of aspects 1 through 12.

Aspect 23: An apparatus for wireless communication at a UE, comprising at least one means for performing a method of any of aspects 1 through 12.

Aspect 24: A non-transitory computer-readable medium storing code for wireless communication at a UE, the code comprising instructions executable by a processor to perform a method of any of aspects 1 through 12.

Aspect 25: An apparatus for wireless communication at an access network entity, comprising a processor; memory coupled with the processor; and instructions stored in the memory and executable by the processor to cause the apparatus to perform a method of any of aspects 13 through 21.

Aspect 26: An apparatus for wireless communication at an access network entity, comprising at least one means for performing a method of any of aspects 13 through 21.

Aspect 27: A non-transitory computer-readable medium storing code for wireless communication at an access network entity, the code comprising instructions executable by a processor to perform a method of any of aspects 13 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    communicating with a first cell using at least a first UE beam, wherein the first UE beam is a narrower beam than a second UE beam used for a first synchronization signal block that is transmitted by the first cell;
    measuring a quality metric of the second UE beam for the first cell and one or more other quality metrics of one or more other UE beams for other synchronization signal blocks of one or more cells including the first cell, one or more neighbor cells, or any combinations thereof; and
    transmitting a measurement report to the first cell based at least in part on the quality metric measurements, wherein the measurement report indicates a highest quality measurement for at least one of the first cell or one or more neighbor cells within a predetermined time period, wherein the transmitting the measurement report comprises generating a measurement report message that includes the quality metric measurements, which are measured within the predetermined time period prior to generating the measurement report message, wherein the quality metric measurements include a timed cell quality metric that indicates a highest quality synchronization signal block measurement within the predetermined time period for each reported synchronization signal block of the first cell and one or more neighbor cells.

2. The method of claim 1, wherein the transmitting the measurement report based at least in part on the second UE beam of the first cell prompts an earlier transmission of the measurement report relative to a measurement report that is based on a quality metric measurement of the first UE beam.

3. The method of claim 1, wherein the quality metric measurements include a timed synchronization signal block quality metric that indicates a highest quality measurement on channel state information (CSI) reference signal resources or synchronization signal block resources of the first cell and one or more neighbor cells.

4. The method of claim 1, wherein the transmitting the measurement report further comprises:
determining that one or more measurements within the predetermined time period cross a threshold value for triggering the measurement report.

5. The method of claim 1, wherein one or more quality metric measurements obtained prior to the predetermined time period are excluded from the measurement report message.

6. The method of claim 1, further comprising:
receiving, from the first cell, configuration information that enables usage of the quality metric of the second UE beam for triggering the transmission of the measurement report.

7. The method of claim 6, wherein the configuration information includes time threshold information for including quality metric measurements in the measurement report.

8. The method of claim 7, further comprising:
determining, based at least in part on one or more parameters provided in the configuration information, a time threshold for including quality metric measurements in the measurement report.

9. The method of claim 8, wherein the one or more parameters include one or more of a measured mobility of the UE, a number of active UE beams, a periodicity of synchronization signal block transmissions, or any combinations thereof.

10. The method of claim 1, wherein the measurement report includes the quality metric of the first synchronization signal block and one or more quality metrics associated with the first UE beam.

11. A method for wireless communication at an access network entity, comprising:
communicating with a user equipment (UE) via a first cell using at least a first UE beam, wherein the first UE beam is a narrower beam than a second UE beam used for a first synchronization signal block that is transmitted by the first cell;
configuring the UE to trigger transmission of a measurement report based at least in part on a quality metric of the second UE beam of the first cell and one or more other quality metrics of one or more other UE beams for synchronization signal blocks of one or more cells including the first cell, one or more neighbor cells, or any combinations thereof; and
receiving the measurement report from the UE, wherein the measurement report:
indicates a highest quality measurement for at least one of the first cell or one or more neighbor cells within a predetermined time period, and
includes quality metric measurements that are measured within the predetermined time period prior to generating the measurement report, wherein the quality metric measurements include a timed cell quality metric that indicates a highest quality synchronization signal block measurement within the predetermined time period for each reported synchronization signal block of the first cell and one or more neighbor cells.

12. The method of claim 11, wherein the quality metric measurements include a timed synchronization signal block quality metric that indicates a highest quality measurement on channel state information (CSI) reference signal resources or synchronization signal block resources of the first cell and one or more neighbor cells.

13. The method of claim 11, wherein the configuring the UE further comprises:
transmitting configuration information to the UE that indicates the UE is to exclude one or more quality metric measurements obtained prior to the predetermined time period from the measurement report.

14. The method of claim 13, wherein the configuration information includes time threshold information for including quality metric measurements in the measurement report.

15. The method of claim 14, further comprising:
the configuration information includes one or more parameters for determining a time threshold for including quality metric measurements in the measurement report.

16. The method of claim 15, wherein the one or more parameters include one or more of a measured mobility of the UE, a number of active UE beams, a periodicity of synchronization signal block transmissions, or any combinations thereof.

17. The method of claim 11, wherein the measurement report includes the quality metric of the first synchronization signal block and one or more quality metrics associated with the first UE beam.

18. A user equipment (UE), comprising:
one or more memories storing processor-executable code; and
one or more processors coupled with the one or more memories and individually or collectively operable to execute the code to cause the UE to:
communicate with a first cell using at least a first UE beam, wherein the first UE beam is a narrower beam than a second UE beam used for a first synchronization signal block that is transmitted by the first cell;
measure a quality metric of the second UE beam for the first cell and one or more other quality metrics of one or more other UE beams for other synchronization signal blocks of one or more cells including the first cell, one or more neighbor cells, or any combinations thereof; and
transmit a measurement report to the first cell based at least in part on the quality metric measurements, wherein transmission of the measurement report is triggered based at least in part on the quality metric measured for the second UE beam of the first cell, and the measurement report indicates a highest quality measurement for at least one of the first cell or one or more neighbor cells within a predetermined time period, wherein, to transmit the measurement report, the one or more processors are individually or collectively operable to cause the UE to generate a measurement report message that includes the quality metric measurements, which are measured within the predetermined time period prior to generating the measurement report message, wherein the quality metric measurements include a timed cell quality metric that indicates a highest quality synchronization signal block measurement within the predetermined time period for each reported synchronization signal block of the first cell and one or more neighbor cells.

19. The UE of claim 18, wherein the measurement report based at least in part on the second UE beam of the first cell prompts an earlier transmission of the measurement report relative to a measurement report that is based on a quality metric measurement of the first UE beam.

20. The UE of claim 18, wherein the quality metric measurements include a timed synchronization signal block quality metric that indicates a highest quality measurement on channel state information (CSI) reference signal resources or synchronization signal block resources of the first cell and one or more neighbor cells.

21. The UE of claim 18, wherein, to transmit the measurement report, the one or more processors are operable to cause the UE to:
   determine that one or more measurements within the predetermined time period cross a threshold value for triggering the measurement report.

22. The UE of claim 18, wherein one or more quality metric measurements obtained prior to the predetermined time period are excluded from the measurement report message.

23. An access network entity, comprising:
   one or more memories storing processor-executable code; and
   one or more processors coupled with the one or more memories and individually or collectively operable to execute the code to cause the access network entity to:
      communicate with a user equipment (UE) via a first cell using at least a first UE beam, wherein the first UE beam is a narrower beam than a second UE beam used for a first synchronization signal block that is transmitted by the first cell;
      configure the UE to trigger transmission of a measurement report based at least in part on a quality metric of the second UE beam of the first cell and one or more other quality metrics of one or more other UE beams for synchronization signal blocks of one or more cells including the first cell, one or more neighbor cells, or any combinations thereof, and
      receive the measurement report from the UE, wherein the measurement report:
         indicates a highest quality measurement for at least one of the first cell or one or more neighbor cells within a predetermined time period, and
         includes quality metric measurements that are measured within the predetermined time period prior to generating the measurement report, wherein the quality metric measurements include a timed cell quality metric that indicates a highest quality synchronization signal block measurement within the predetermined time period for each reported synchronization signal block of the first cell and one or more neighbor cells.

24. The access network entity of claim 23, wherein the measurement report includes the quality metric of the first synchronization signal block and one or more quality metrics associated with the first UE beam.

* * * * *